United States Patent [19]

Kataoka et al.

[11] Patent Number: 5,228,340
[45] Date of Patent: Jul. 20, 1993

[54] METHOD AND APPARATUS FOR HEAT RADIATING TYPE LEVEL SENSOR MEASUREMENT OF LIQUID LEVEL

[75] Inventors: Ichiro Kataoka; Naoto Ishikawa; Hiroyuki Ogura, all of Shizuoka, Japan

[73] Assignee: Yazaki Corporation, Japan

[21] Appl. No.: 877,284

[22] Filed: May 1, 1992

[30] Foreign Application Priority Data

| May 1, 1991 | [JP] | Japan | 3-100017 |
| May 10, 1991 | [JP] | Japan | 3-106079 |
| Jun. 11, 1991 | [JP] | Japan | 3-138906 |

[51] Int. Cl.$^5$ .............................. G01F 23/24
[52] U.S. Cl. ........................ 73/295; 364/509
[58] Field of Search ............ 73/295, 304 R; 364/557, 364/509, 571.02, 562, 571.03

[56] References Cited

U.S. PATENT DOCUMENTS

| 4,053,874 | 10/1977 | Glaser | 73/295 |
| 4,163,391 | 8/1979 | Bezard et al. | 73/295 |
| 4,361,037 | 11/1982 | Hauschild et al. | 73/295 |
| 4,425,795 | 1/1984 | Albrecht et al. | 73/295 |
| 4,509,044 | 4/1985 | Yachida | 73/295 |
| 4,525,850 | 6/1985 | Miller | 73/304 R |
| 4,619,140 | 10/1986 | Kühnel | 73/295 |
| 4,633,491 | 12/1986 | Kühnel | |
| 4,640,127 | 2/1987 | Schneider | 73/295 |
| 4,825,383 | 4/1989 | Ory | 73/295 |
| 4,912,646 | 3/1990 | Cerruti | 73/304 R |
| 4,943,797 | 7/1990 | Steffenhagen | |
| 5,007,288 | 4/1991 | Sasaki et al. | 73/295 |
| 5,143,452 | 9/1992 | Maxedon | 73/295 |

FOREIGN PATENT DOCUMENTS

| 60-151519 | 9/1985 | Japan |
| 2-157621 | 6/1990 | Japan |
| 271708 | 6/1927 | United Kingdom |

Primary Examiner—William A. Cuchlinski, Jr.
Assistant Examiner—G. Bradley Bennett
Attorney, Agent, or Firm—Wigman, Cohen, Leitner & Myers

[57] ABSTRACT

A heat radiating type level sensor measurement of liquid level capable of preventing the errors in a case of sudden environmental temperature change, and accounting for the agitated motion of the liquid surface. The measured liquid level can be obtained as the steady state output voltage plus a difference between the initial output voltage for a present measurement and the initial output voltage for an immediately preceding measurement, with the difference multiplied by a predetermined constant. The measured liquid level for a present measurement can also be obtained as an arithmetic average of the steady state output voltage and a predetermined number of previous steady state output voltages within a prescribed range obtained by previous measurements, in a case the steady state output voltage derived at the deriving step is within the prescribed range, and as the measured liquid level obtained for an immediately preceding measurement, in a case the steady state output voltage derived at the deriving step is outside of the prescribed range.

14 Claims, 17 Drawing Sheets

ARITHMETIC MEAN FOR IMMEDIATELY PRECEDING MEASUREMENT CYCLE

OUTSIDE OF RANGE

PRESCRIBED RANGE

WITHIN RANGE

DATA NO.  1  2  3  4  5  6  7

1ST  ○  (MEMORIZED VALUE)

2ND  ○ ○  AVERAGE OF TWO VALUES

3RD  ○ ○ ○  AVERAGE OF THREE VALUES

4TH  ○ ○ ○ ○  AVERAGE OF FOUR VALUES

5TH  ○ ○ ○ ○ ●  (OUTSIDE OF RANGE, PREVIOUS VALUE RETAINED)

6TH  ○ ○ ○ ○ ● ○  AVERAGE OF FIVE VALUES

7TH  ○ ○ ○ ○ ● ○ ○  AVERAGE OF FIVE VALUES

METHOD AND APPARATUS FOR HEAT RADIATING TYPE LEVEL SENSOR MEASUREMENT OF LIQUID LEVEL

BACKGROUND OF THE INVENTION

1. Field of the Invention

The present invention relates to a method and an apparatus for measurement of a liquid level using a heat radiating type level sensor, suitable for the detection of the fuel level in a fuel tank of an automobile.

2. Description of the Background Art

A heat radiating type level sensor is a sensor for measuring the liquid level which utilizes the fact that the resistivity of the sensor made of a resistive body changes according to a depth by which the sensor is immersed into the liquid. As an example, a method using a pulse shaped constant current will now be described.

In this method, a constant current is conducted through the sensor for several seconds, such that the sensor output voltage is increased, where the amount of increase of the sensor output voltage corresponds to the liquid level. Here, however, the voltage level difference between FULL state and EMPTY state is small at the end of the current conduction period, so that the practically sufficient resolution cannot be achieved by the straightforward measurement of the increased voltage level. For this reason, in this method, the output proportional to the liquid level is obtained from an average slope for the increase of the sensor output voltages instead of the amount of increase of the sensor output voltages.

More specifically, the sensor output voltage is digitally recorded in every few msec, and the slope is derived by the linear approximation processing carried out at a micro-computer, so as to improve the resolution in the output, as follows.

Namely, as shown in a graph of FIG. 1B in which a horizontal axis represents time and a vertical axis represents current, a current conduction starts at a time $t_0$, and a constant current is applied between a time $t_0'$ and a time $t_f$ and such a pulse shaped current conduction is repeated intermittently. In response to this pulse shaped current conduction, as shown in a graph of FIG. 1A, the sensor output voltages $V_1, V_2, —, V_f$ are measured at time $t_1, t_2, —, t_f$, respectively. Then, each of the measured sensor output voltages is divided by the initial sensor output voltage $V_1$ in order to compensate the environmental temperature dependence. Next, as shown in FIG. 2, a linearly approximated output voltage Vtc' at a time tc is obtained by linearly approximating the slope of the increase of the measured output voltages with respect to time using the sensor output voltages measured at time $t_1$ to $t_n$. Then, as shown in FIG. 2, according to this linearly approximated output voltage Vtc', the steady state output voltage Vtc at a time tc is derived as a measured liquid level by using the appropriate data processing.

Now, as shown in FIG. 3A, the measured output voltage changes in response to the pulse shaped current conduction shown in FIG. 3B, where a slope Sa is a case of the high enviromental temperature and a slope Sb is a case of the low environmental temperature. As can be seen in FIG. 3A, when the sensor temperature is considered to be identical to the environmental temperature at the beginning of the current conduction period, the the measured output voltage becomes larger for the higher environmental temperature.

For this reason, as shown in FIG. 4A, the environmental temperature dependence of the measured output voltages is compensated in a slope Sc corresponding to the pulse shaped current conduction shown in FIG. 4B, which is obtained by dividing the measured output voltages by the initial measured output voltage $V_1$. This slope Sc is almost identical in either case of the high or low environmental temperature.

However, as shown in FIG. 5A, by comparing a slope Sd for the measured output voltages in a case in which the sensor temperature is equal to the environmental temperature and a slope Se for the measured output voltages in a case in which the sensor temperature is lower than the environmental temperature, both of which are obtained in response to the pulse shaped current conduction shown in FIG. 5B and subjected to the above described environmental temperature dependence compensation, it can be seen that even when the initial output voltage is the same, the slope Se can be smaller than the slope Sd.

In other words, the above described environmental temperature dependence compensation assumes that the sensor temperature is identical to the environmental temperature. Consequently, when there is a sudden change in the environmental temperature for example, the sensor temperature cannot follow this sudden change of the environmental temperature because of the large heat capacity of the sensor, such that the measured output voltages can be lowered as in the slope Se shown in FIG. 5A, and the errors can be introduced into the measured output voltages.

In addition, in the application to the fuel tank of an automobile, there is a case in which the fuel is agitated to change the fuel level during the running of the automobile, such that the correct remaining fuel level cannot be obtained.

Furthermore, in the heat radiating type level sensor, the sensor is heated during the measurement, so that the sensor temperature is higher than the environmental temperature after each measurement, so that there is a need to provide a cooling period for cooling down the sensor temperature to the level of the environmental temperature, between each successive measurements. Consequently, the measurement interval becomes considerably long, and this in turn prevents the use of a simple data processing such as the averaging of a large number of measurements made in a short period of time.

SUMMARY OF THE INVENTION

It is therefore an object of the present invention to provide a method and an apparatus of heat radiating type level sensor measurement of liquid level capable of preventing the errors in a case of sudden environmental temperature change.

It is another object of the present invention to provide a method and an apparatus of heat radiating type level sensor measurement of liquid level capable of accounting for the agitated motion of the liquid surface.

According to one aspect of the present invention there is provided a method of heat radiating type level sensor measurement of liquid level, comprising the steps of: applying constant currents intermittently to a heat radiating type level sensor made of a resistive body which is immersed into a liquid; measuring output voltages of the heat radiating type liquid sensor in response to the constant currents applied at the applying step;

dividing the output voltages measured at the measuring step by an initial output voltage, to obtain adjusted output voltages; deriving a steady state output voltage from a slope of the adjusted output voltages obtained at the dividing step with respect to time; and determining a measured liquid level from the steady state output voltage derived at the deriving step, according to:

$$V'tc = Vtc + (V_1 - V'_1) \times G$$

where V'tc is the measured liquid level, Vtc is the steady state output voltage, $V_1$ is the initial output voltage for a present measurement, $V'_1$ is the initial output voltage for an immediately preceding measurement, and G is a predetermined constant.

According to another aspect of the present invention there is provided a method of heat radiating type level sensor measurement of liquid level, comprising the steps of: applying constant currents intermittently to a heat radiating type level sensor made of a resistive body which is immersed into a liquid; measuring output voltages of the heat radiating type liquid sensor in response to the constant currents applied at the applying step; deriving a steady state output voltage from the output voltages measured at the measuring step; and determining a measured liquid level for a present measurement as an arithmetic average of the steady state output voltage derived at the deriving step and a predetermined number of previous steady state output voltages within a prescribed range which had been obtained by previous measurements, in a case the steady state output voltage derived at the deriving step is within the prescribed range, and as the measured liquid level which had been obtained for an immediately preceding measurement, in a case the steady state output voltage derived at the deriving step is outside of the prescribed range.

According to another aspect of the present invention there is provided a method of heat radiating type level sensor measurement of liquid level, comprising the steps of: applying constant currents intermittently to a heat radiating type level sensor made of a resistive body which is immersed into a liquid; measuring output voltages of the heat radiating type liquid sensor in response to the constant currents applied at the applying step; setting offset voltages according to the output voltages measured at the measuring step; obtaining difference voltages by subtracting the offset voltages set at the setting step from the output voltages measured at the measuring step; converting the difference voltages obtained at the obtaining step into digital voltage signals; deriving a steady state output voltage from the offset voltages set at the setting step and the digital voltage signals obtained at the converting step; and determining a measured liquid level from the steady state output voltage derived at the deriving step.

According to another aspect of the present invention there is provided a heat radiating type level sensor system for measuring a liquid level, comprising: a heat radiating type level sensor made of a resistive body which is immersed into a liquid; constant current supply means for applying constant currents intermittently to the heat radiating type level sensor; output detection means for measuring output voltages of the heat radiating type liquid sensor in response to the constant currents applied by the constant current supply means; offset setting means for setting offset voltages according to the output voltages measured by the output detecting means; differential amplifier means for obtaining difference voltages by subtracting the offset voltages set by the offset setting means from the output voltages measured by the output detection means; an A/D converter for converting the difference voltages obtained by the differential amplifier means into digital voltage signals; processor means for deriving a steady state output voltage from the offset voltages set by the offset setting means and the digital voltage signals obtained by the A/D converter; and output means for determining a measured liquid level from the steady state output voltage derived by the processor means.

Other features and advantages of the present invention will become apparent from the following description taken in conjunction with the accompanying drawings.

DETAILED DESCRIPTION OF THE PREFERRED EMBODIMENTS

Figure 6:
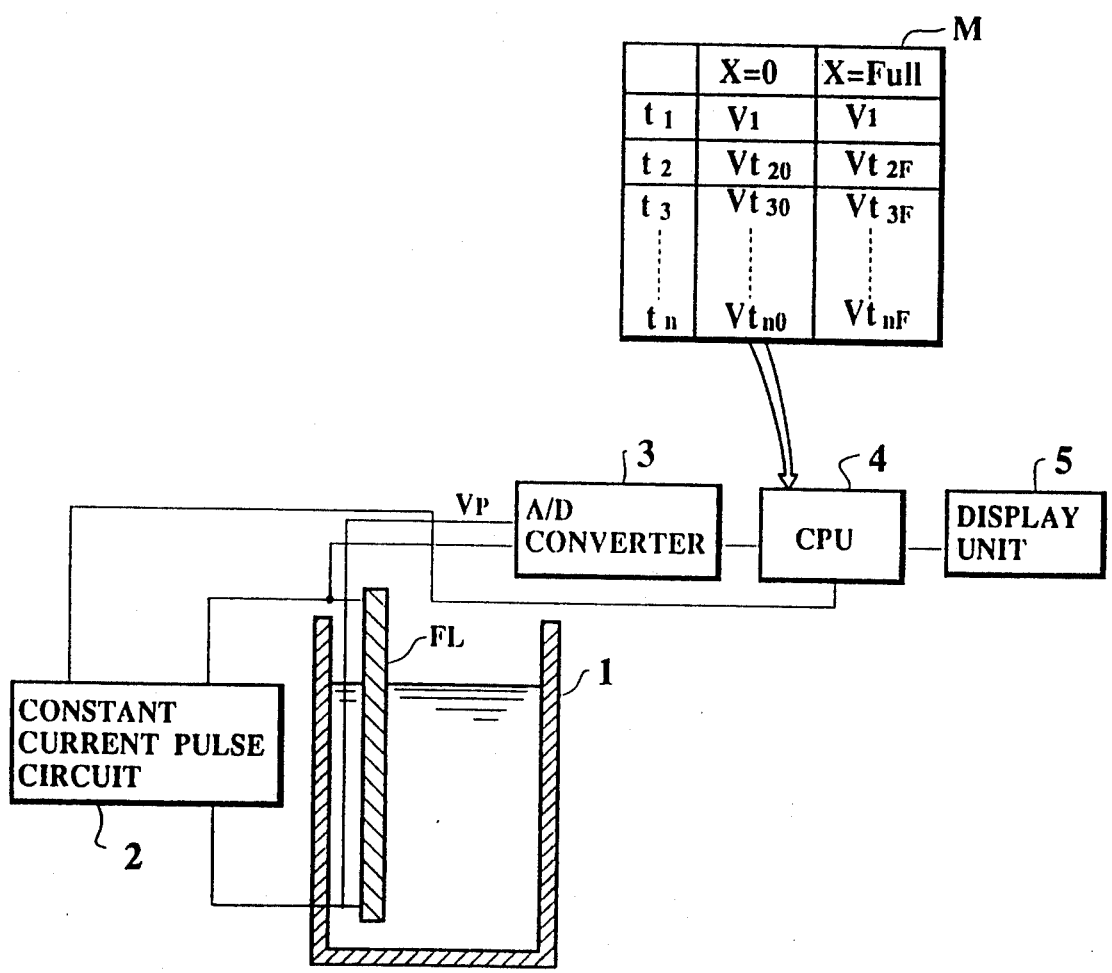
FIG. 6 is a schematic block diagram of a heat radiating type level sensor system to be used in the first and second embodiments of a method of heat radiating type level sensor measurement of liquid level according to the present invention.

Referring now to FIG. 6, a heat radiating type level sensor system to be used in the first and second embodiments of a method of heat radiating type level sensor measurement of liquid level according to the present invention will be described in detail.

This heat radiating type level sensor system of FIG. 6 is substantially equivalent to the heat radiating type level sensor system disclosed in U.S. patent application Ser. No. 07/683,196, except for the further data processing required according to the first and second embodiments of the present invention as described below. In the following, only those features of this heat radiating type level sensor system of FIG. 6 which is pertinent to the proper understanding of the present invention will be described, and this reference should be consulted for further details concerning this heat radiating type level sensor system which cannot be found in the following description.

This heat radiating type level sensor system of FIG. 6 comprises: a fuel tank 1 containing the fuel whose level is to be measured; a sensor FL made of a resistive body which is immersed into the fuel inside the fuel tank 1; a constant current pulse circuit 2 for supplying a constant current I between two ends of the sensor FL; an A/D converter 3 for converting output voltage Vp produced between the two ends of the sensor FL by the constant current I supplied from the constant current pulse circuit 2 into digital voltage signals; a CPU 4 for processing the digital voltage signals obtained by the A/D converter 3 to obtain the measured liquid level; and a display unit 5 for displaying the measured liquid level obtained by the CPU 4.

Figure 7A:
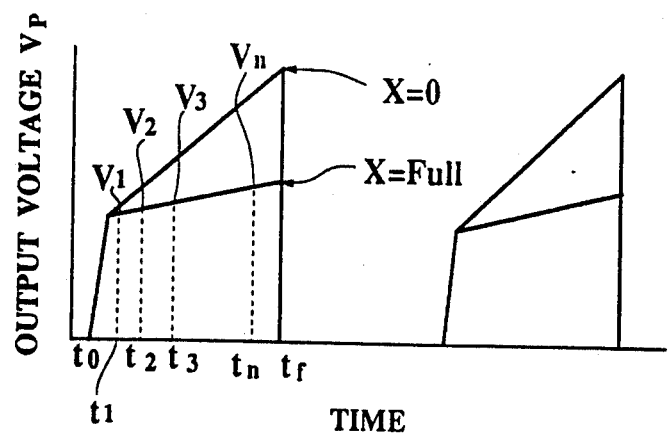
FIGS. 7A and 7B are graphs of pulse shaped current and measured output voltage in the first embodiment of a method of heat radiating type level sensor measurement of liquid level according to the present invention.
Figure 7B:
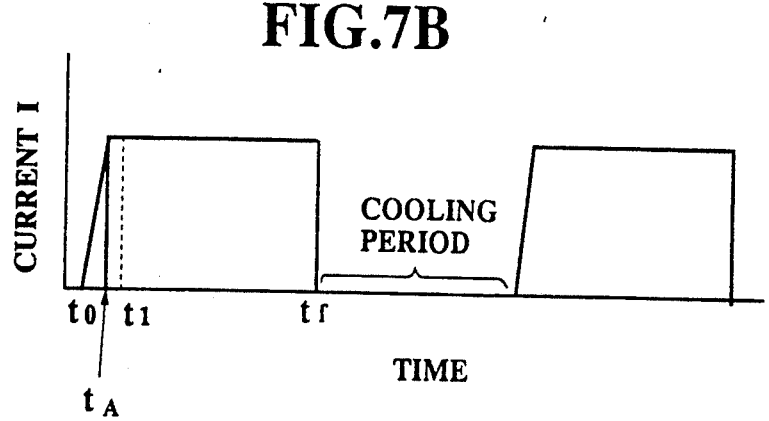

The constant current pulse circuit 2 generates pulse shaped currents I shown in FIG. 7B in which a measurement cycle including a conduction period between times $t_0$ and $t_1$ followed by a predetermined cooling period is repeated, where each measurement cycle takes approximately 3 seconds. In response, the output voltage Vp takes a form shown in FIG. 7A, in which the output voltage Vp repeats the cycle of increase from the initial voltage with a slope corresponding to the liquid level, where the larger slope corresponds to the lower liquid level. The output voltage Vp is measured at predetermined sampling timings $t_1$ to $t_n$ and subsequently taken into the CPU 4 through the A/D converter 3 and stored in a memory M of the CPU 4 in conjunction with the measurement time, as shown in FIG. 6.

Here, in a case the sampling timing interval of 10 msec is used for the measurement cycle of 3 seconds, 300 in total number of the measured output voltages Vp can be obtained between the timings $t_1$ and $t_f$.

In each measurement cycle, the initial output voltage $V_1$ measured at a time $t_1$ can be regarded as the output in a state in which the sensor FL is not yet heated up by the conduction of the current I.

On the other hand, because of the large heat capacity of the sensor FL, the measured output voltage Vp does not reaches to the steady state voltage level in any of the output voltages $V_0$ to $V_f$ measured within each measurement cycle.

Accordingly the CPU 4 carries out the following data processing.

First, the CPU 4 memorizes the initial output voltage $V_1$, and divides the subsequently measured output voltages $V_2$ to $V_n$ by this initial output voltage $V_1$, in order to compensate the environmental temperature dependence.

Figure 8:
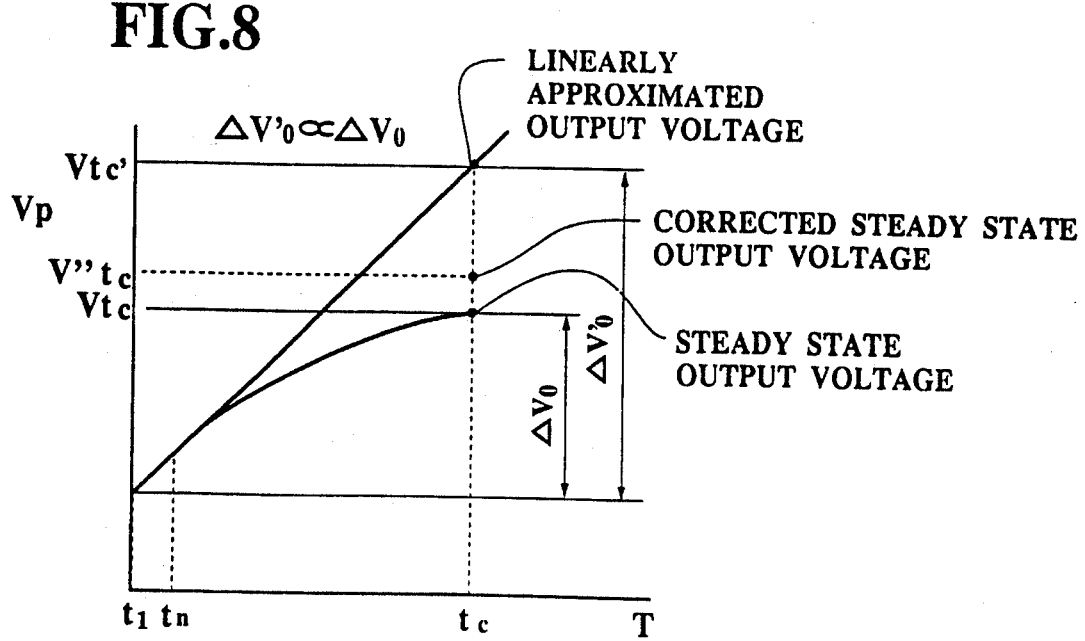
FIG. 8 is a graph for obtaining a steady state output voltage from the measured output voltage in the first embodiment of a method of heat radiating type level sensor measurement of liquid level according to the present invention.

Then, as shown in FIG. 8, the CPU 4 calculates the linearly approximated output voltage Vtc' at a time tc by linearly approximating the slope of the increase of the measured output voltages with the environmental temperature dependence compensation $V_1/V_1$ to $V_n/V_1$ with respect to time $t_1$ to $t_n$, and according to this linearly approximated output voltage Vtc', the CPU 4 derives the steady state output voltage Vtc at a time tc, using prescribed data processing programs installed into the CPU 4.

At this point, according to the first embodiment of the method of heat radiating type level sensor measurement of liquid level according to the present invention, the CPU 4 further makes a correction on the derived steady state output voltage Vtc to obtain a corrected steady state output voltage V"tc, as shown in FIG. 8, in order to compensate the difference between the sensor temperature and the environmental temperature, according to the following equation (1).

$$V''tc = Vtc + (V_1 - V'_1) \times G \quad (1)$$

where $V_1$ is the initial output voltage in the present measurement cycle, $V'_1$ is the initial output voltage in the immediately preceding measurement cycle, and G is an empirically determined constant. The constant G must be determined empirically, as it depends on the shape of the sensor FL, the heat capacity of the sensor FL, material used for coating the sensor FL, and other factors.

Finally, the CPU 4 displays the obtained corrected steady state output voltage V"tc as the measured liquid level on the display unit 5.

Now, the reasons behind the above described correction for compensating the difference between the sensor temperature and the environmental temperature according to the equation (1) will be explained in detail.

First, it is noted that the errors due to the difference between the sensor temperature and the environmental temperature must be compensated according to the extent and the speed of the change in the environmental temperature.

Consider a case in which an object at one temperature is placed inside the air of another constant temperature. In this case, the heat flow speed (amount of movement of heat per unit volume or per unit length) is proportional to the temperature difference between the object and the air. Accordingly, by measuring the temperature of the object at regular intervals, it becomes possible to estimate the temperature difference between the object and the air at each interval. Namely, when the temperatures of the object measured at two successive measurements are different by a larger extent, the temperature difference between the object and the air can be considered as larger.

Consequently, in the first embodiment described above, the variations in the temperature of the sensor itself is accounted by dividing the measured output voltages by the initial output voltage, while the extent and the speed of the change in the environmental temperature are accounted by using the difference between the initial output voltages of the present and the immediately preceding measurement cycles.

Figure 9:
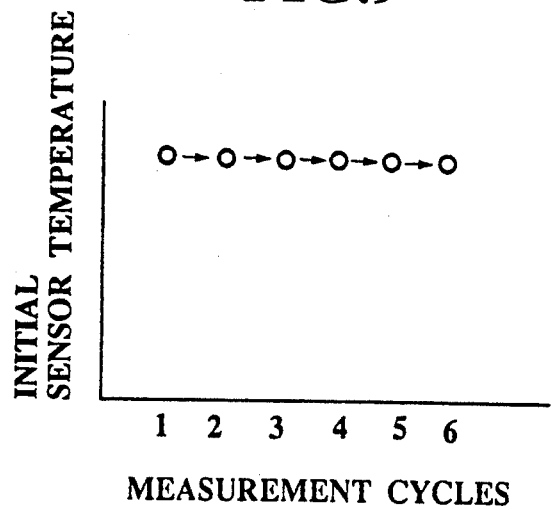
FIG. 9 is a graph of initial sensor temperature versus measurement cycle, for explaining the effectiveness of the first embodiment of a method of heat radiating type level sensor measurement of liquid level according to the present invention.

Now, in a case the sensor temperature and the environmental temperature are equal to each other at a constant level, the initial sensor temperature at the beginning of each measurement cycle remains the same, no matter how many measurement cycles are carried out, as shown in FIG. 9.

Figure 10A:
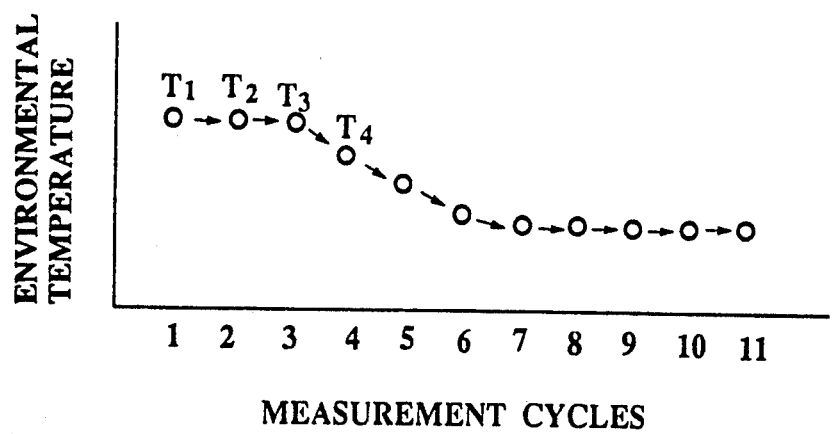
FIG. 10A is a graph of environmental temperature versus measurement cycle, for explaining the effectiveness of the first embodiment of a method of heat radiating type level sensor measurement of liquid level according to the present invention.
Figure 10B:
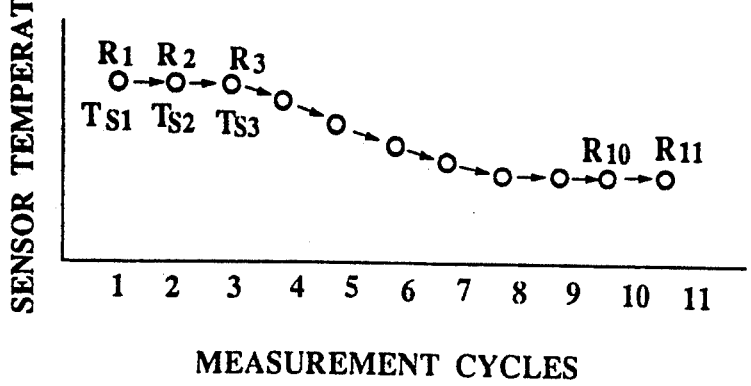
FIG. 10B is a graph of sensor temperature versus measurement cycle, for explaining the effectiveness of the first embodiment of a method of heat radiating type level sensor measurement of liquid level according to the present invention.

On the other hand, when the environmental temperature changes in time as $T_1$, $T_2$, etc. shown in FIG. 10A, the sensor temperature follows this change of the environmental temperature and also changes as $T_{S1}$, $T_{S2}$, etc. shown in FIG. 10B, where these sensor temperature $T_{S1}$, $T_{S2}$, etc. correspond to initial resistivity $R_1$, $R_2$, etc. of the sensor FL.

Figure 11A:
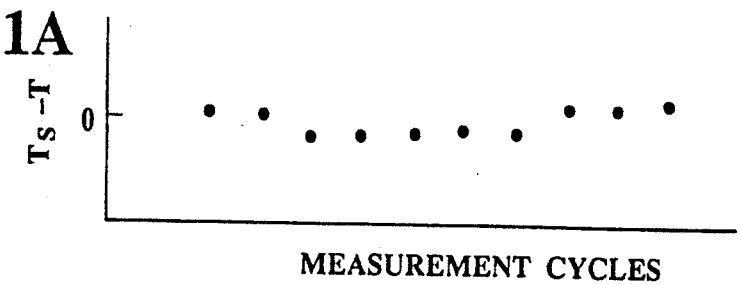
FIG. 11A is a graph of a difference between sensor temperature and environmental temperature versus measurement cycle, for explaining the effectiveness of the first embodiment of a method of heat radiating type level sensor measurement of liquid level according to the present invention.

In such a case, the difference between the sensor temperature and the environmental temperature also varies as shown in FIG. 11A. In addition, the difference of the initial sensor resistivity between the present measurement cycle and the immediately preceding measurement cycle also varies as shown in FIG. 11B.

Figure 11B:
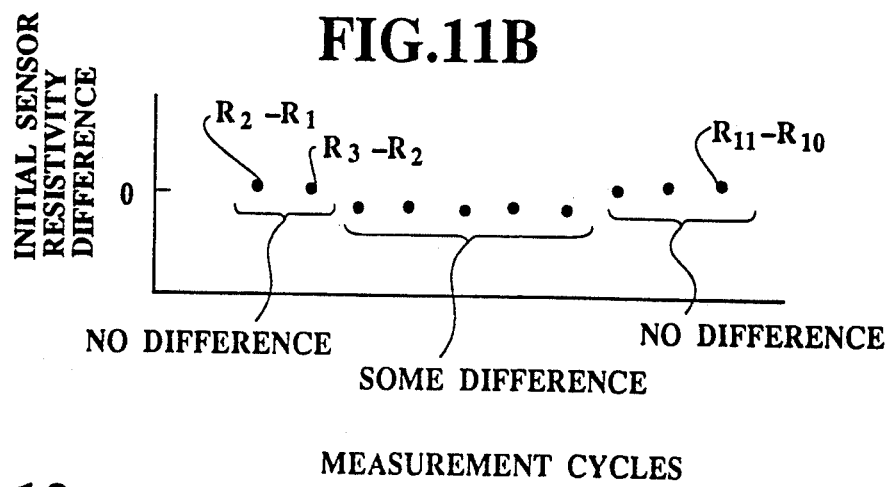
FIG. 11B is a graph of initial sensor resistivity difference versus measurement cycle, for explaining the effectiveness of the first embodiment of a method of heat radiating type level sensor measurement of liquid level according to the present invention.

In view of FIGS. 11A and 11B, it can be concluded that the difference between the sensor temperature and the environmental temperature is substantially proportional to the difference of the initial sensor resistivity between the present measurement cycle and the immediately preceding measurement cycle.

Figure 1A:
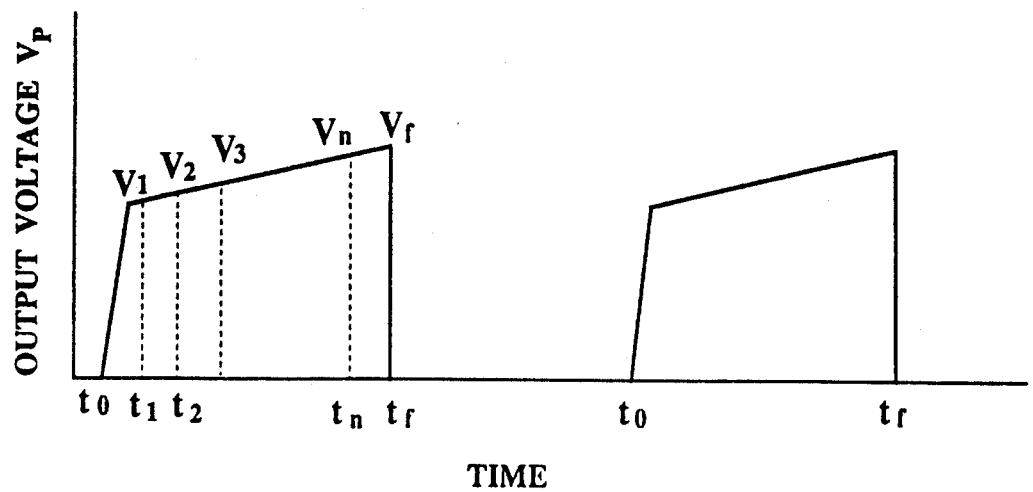
FIGS. 1A and 1B are graphs of pulse shaped current conduction and resulting measured output voltages in a conventional heat radiating type level sensor measurement of liquid level.
Figure 1B:
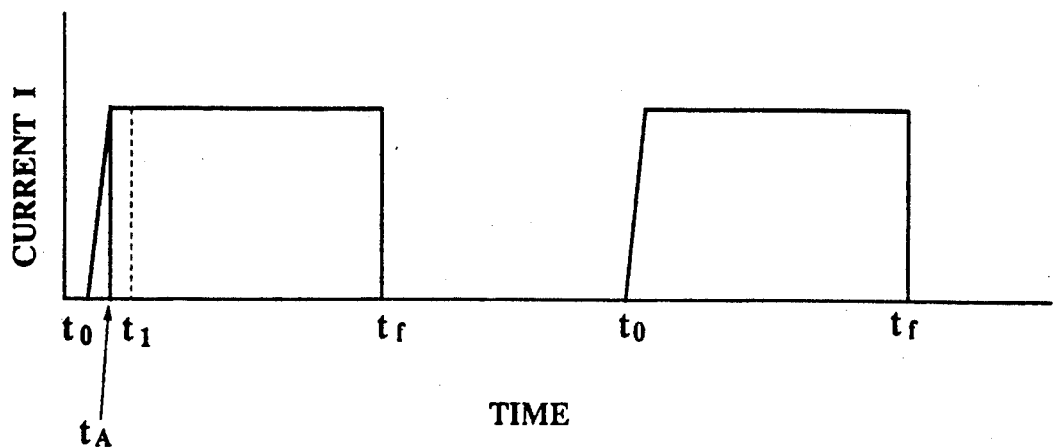
Figure 2:
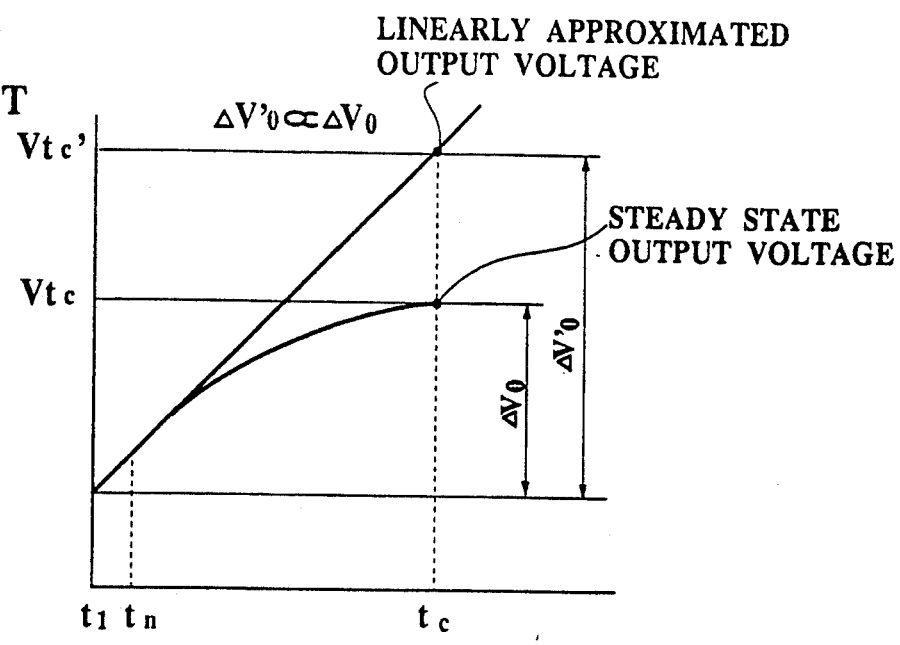
FIG. 2 is a graph for obtaining a steady state output voltage from the measured output voltages in the conventional heat radiating type level sensor measurement of liquid level.
Figure 3A:
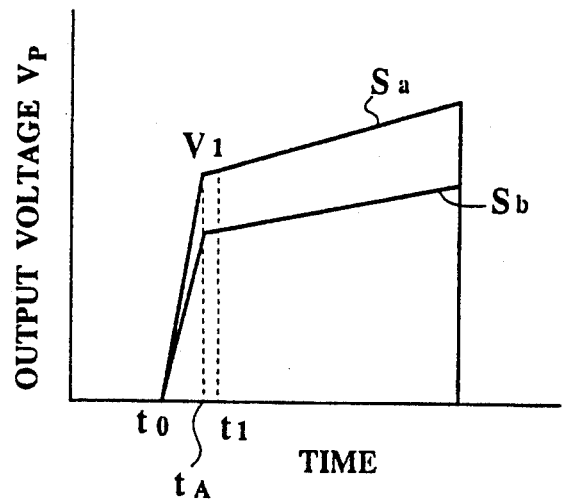
FIGS. 3A and 3B are graphs of pulse shaped current conduction and resulting measured output voltages in a conventional heat radiating type level sensor measurement of liquid level, for two cases of high and low environmental temperatures.
Figure 3B:
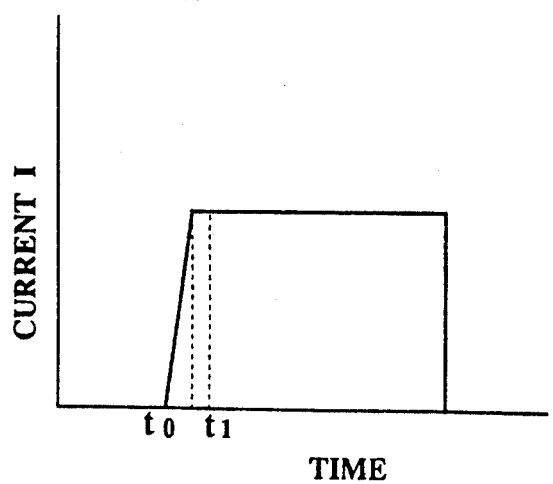
Figure 4A:
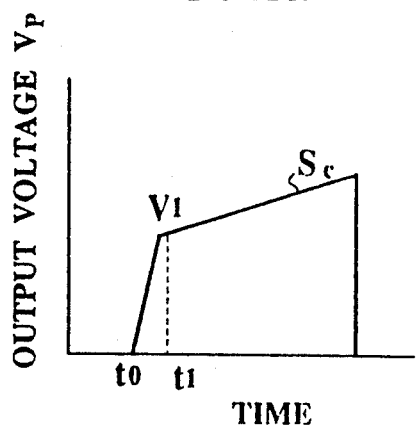
FIGS. 4A and 4B are graphs of pulse shaped current conduction and resulting measured output voltages in a conventional heat radiating type level sensor measurement of liquid level, with environmental temperature dependence compensation applied.
Figure 4B:
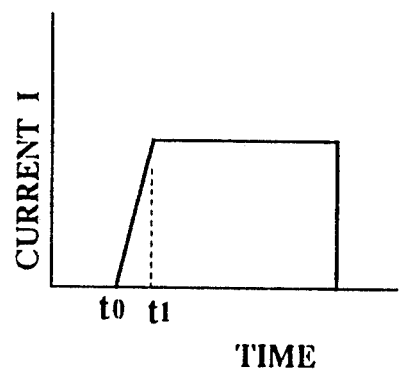
Figure 5A:
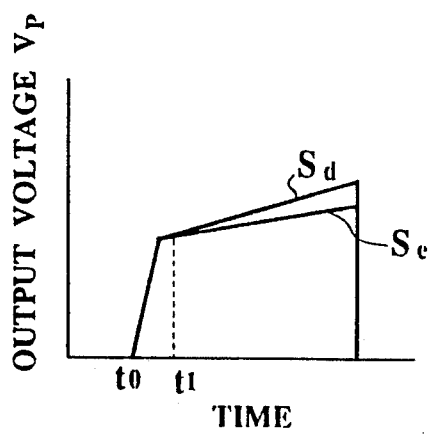
FIGS. 5A and 5B are graphs of pulse shaped current conduction and resulting measured output voltages in a conventional heat radiating type level sensor measurement of liquid level, for two cases of the sensor temperature equal to and lower than the environmental temperature.
Figure 5B:
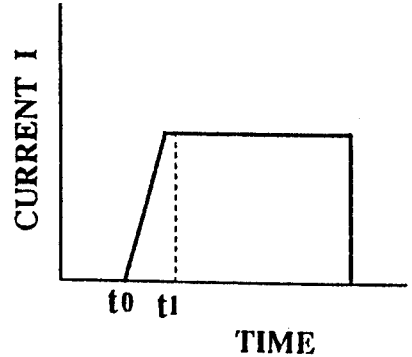

Also, as already described in conjunction with FIGS. 5A and 5B, the output voltage varies in proportion to the difference between the sensor temperature and the environmental temperature.

Figure 12:
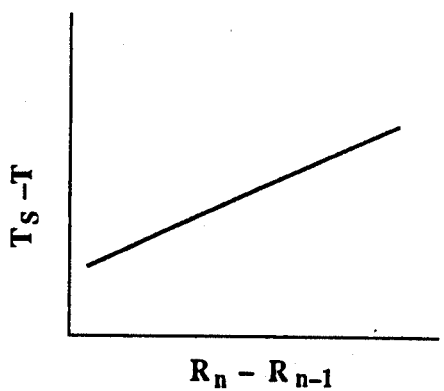
FIG. 12 is a graph of a difference between sensor temperature and environmental temperature versus initial sensor resistivity difference, for explaining the effectiveness of the first embodiment of a method of heat radiating type level sensor measurement of liquid level according to the present invention.
Figure 13:
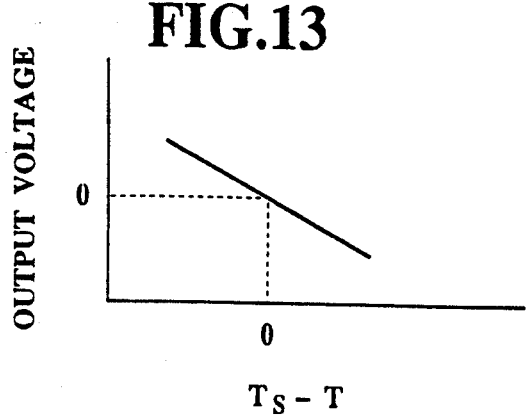
FIG. 13 is a graph of an output voltage versus a difference between sensor temperature and environmental temperature, for explaining the effectiveness of the first embodiment of a method of heat radiating type level sensor measurement of liquid level according to the present invention.

In view of these facts, it can be concluded that the difference between the sensor temperature and the environmental temperature $(T_s - T)$ is proportional to the difference $(R_n - R_n - 1)$ of the initial sensor resistivity between the present measurement cycle and the immediately preceding measurement cycle as shown in FIG. 12, and the difference between the sensor temperature and the environmental temperature $(T_s - T)$ is proportional (actually inversely proportional in this case) to the change in the output voltages as shown in FIG. 13.

Therefore, it becomes possible to compensate the difference between the sensor temperature and the environmental temperature by making a correction according to the equation (1) as described above. In a case shown in FIG. 13, G takes a negative value.

As described, according to this first embodiment, it becomes possible to provide a method of heat radiating type level sensor measurement of liquid level capable of preventing the errors in a case of sudden environmental temperature change.

Figures 14, 15:
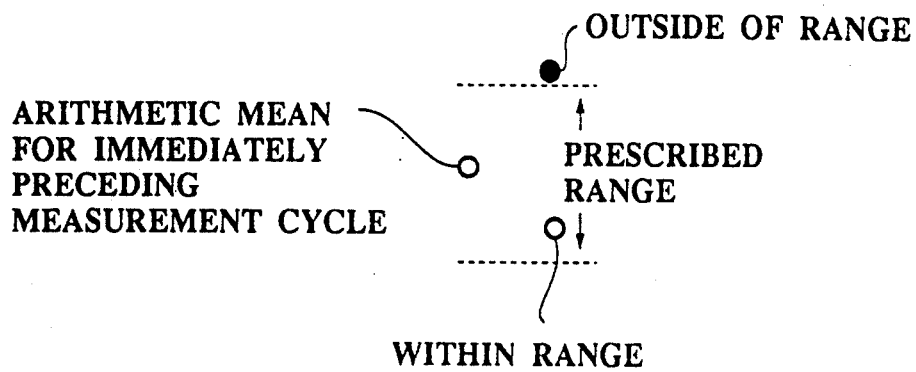
FIG. 14 is a diagram for explaining the prescribed range used in the second embodiment of a method of heat radiating type level sensor measurement of liquid level according to the present invention.
FIG. 15 is a diagram for explaining the averaging procedure used in the second embodiment of a method of heat radiating type level sensor measurement of liquid level according to the present invention.
Figure 16:
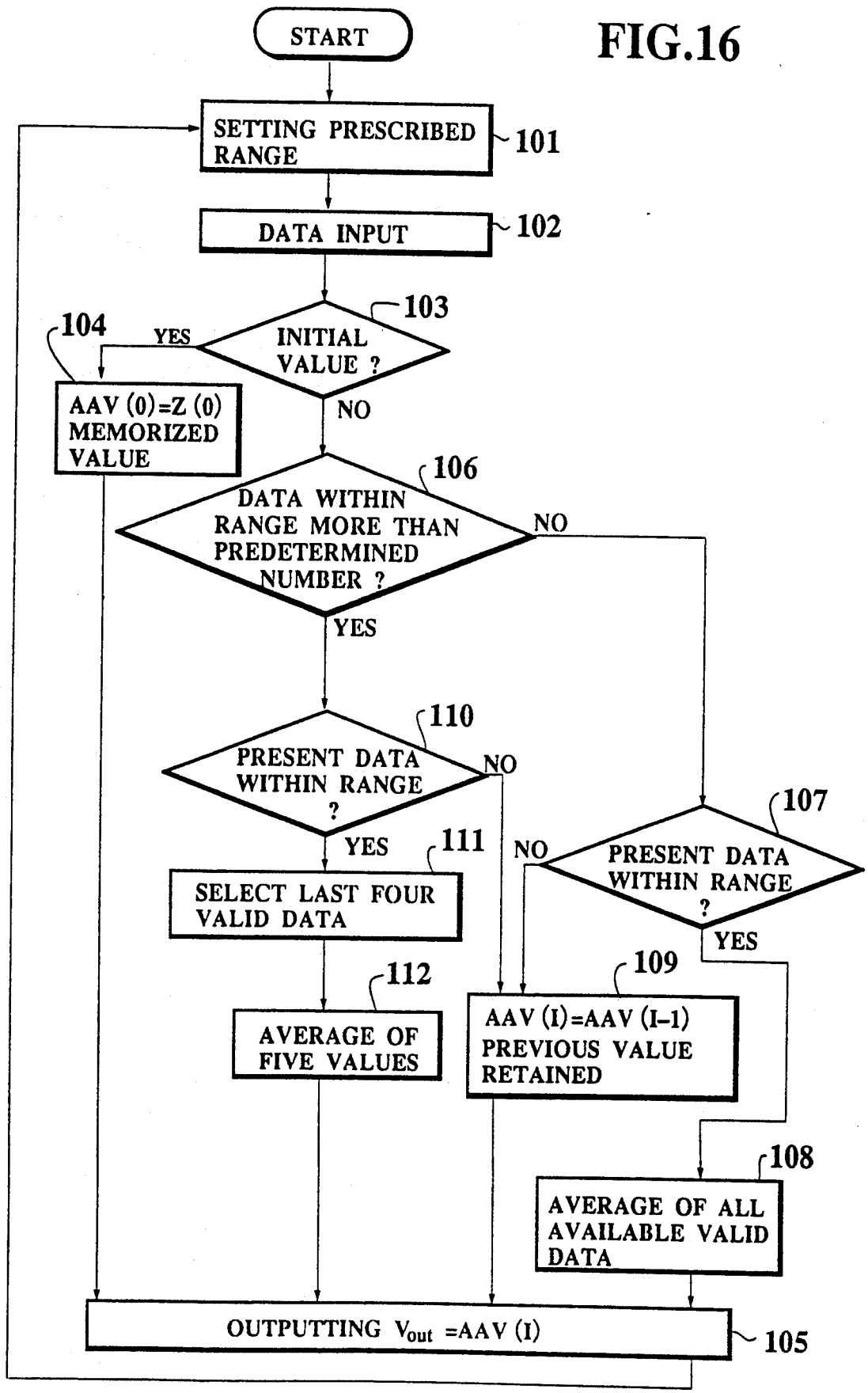
FIG. 16 is a flow chart for the operation in the second embodiment of a method of heat radiating type level sensor measurement of liquid level according to the present invention.

Referring now to FIG. 14 to FIG. 16, the second embodiment of a method of heat radiating type level sensor measurement of liquid level according to the present invention will be described in detail.

In this second embodiment, the heat radiating type level sensor system substantially similar to that shown in FIG. 6 is also used.

In this second embodiment, after the CPU 4 has calculated the linearly approximated output voltage Vtc' at a time tc by linearly approximating the slope of the increase of the measured output voltages $V_1$ to $V_n$ with respect to time $t_1$ to $t_n$, and then derived the steady state output voltage Vtc at a time tc according to this linearly approximated output voltage Vtc', the following procedure is used in obtaining the measured liquid level in order to account for the agitated motion of the liquid surface.

Namely, in this second embodiment, the measured liquid level is obtained by taking an arithmetic average of the steady state output voltage Vtc obtained for the present measurement cycle and the predetermined number of the steady state output voltages obtained for the previous measurement cycles, whenever the presently obtained steady state output voltage has a value within a prescribed range.

Here, the predetermined number of the previously obtained steady state output voltages to be used can be set to any desirable number. For example, this predetermined number can be set equal to 4 as in the exemplary case to be described below.

In a case in which the presently obtained steady state output voltage has a value outside of the prescribed range, the measured liquid level obtained for the immediately preceding measurement cycle is retained for the present measurement cycle, and this presently obtained steady state output voltage will not be counted in the predetermined number of the previously obtained steady state output voltages in the subsequent processing for the subsequent measurement cycle.

Thus, for a case of using five steady state output voltages in calculating the arithmetic average, assuming that the steady state output voltages obtained for the $(N-4)$-th to $(N-1)$-th and $(N+1)$-th measurement cycles are within the prescribed range but the steady state output voltage for the N-th measurement cycle is outside of the prescribed range, the arithmetic average calculated for the $(N-1)$-th measurement cycle is taken as the measured liquid level for the N-th measurement cycle, and the steady state output voltages for the $(N-1)$-th to $(N-1)$-th and $(N+1)$-th measurement cycles are used in calculating the arithmetic average for the $(N+1)$-th measurement cycle.

As for the prescribed range, it is preferable to adjust the range for each measurement cycle in such a manner that, for each measurement cycle, a center of the prescribed range is shifted to the value of the arithmetic average calculated for the immediately previous measurement cycle, as shown in FIG. 14.

For the first steady state output voltage to be used at the beginning of the procedure, the final arithmetic average obtained in the last occasion to carry out the above described procedure (such as a last time the automobile has been used) is memorized in the CPU 4 and used. Thus, in a case of using 4 for the predetermined number of the steady state output voltages used in calculating the arithmetic average, up until the five steady state output voltages within the prescribed range are obtained including the memorized final arithmetic average of the last occasion, the arithmetic average should be calculated by using as many steady state output voltages as already obtained up until then, as shown in FIG. 15 which shows a case in which the steady state output voltage for the fifth measurement cycle has been outside of the prescribed range.

This procedure for obtaining the measured liquid level according to the second embodiment can be carried out in detail according to the flow chart of FIG. 16, as follows.

First, at the step 101, the prescribed range is set according to the arithmetic average obtained for the immediately preceding measurement cycle. At the beginning, the memorized final arithmetic average of the last occasion is used.

Then, at the step 102, the steady state output voltage of the present measurement cycle is entered. At the beginning, the initial value of this steady state output voltage is the memorized final arithmetic average of the last occasion.

Next, at the step 103, whether the steady state output voltage entered at the step 102 is the initial value or not is determined. If yes, the step 104 is taken next, whereas otherwise, the step 106 is taken next.

At the step 104, the first arithmetic average AAV(0) is set equal to the memorized final arithmetic average Z(0) of the last occasion, and next at the step 105, this first arithmetic average AAV(0) is outputted as the first measured liquid level. After this step 105, the procedure returns to the above described step 101, at which the prescribed range is adjusted according to this arithmetic average.

On the other hand, at the step 106, whether a number of steady state output voltages within the prescribed range which has been obtained so far is greater than the predetermined number of the previously obtained steady state output voltages to be used in calculating the arithmetic average or not is determined. If no, the step 107 is taken next, whereas otherwise the step 110 is taken next.

At the step 107, whether the present steady state output voltage is within the prescribed range or not is determined. If yes, the step 108 is taken next, whereas otherwise the step 109 is taken next.

At the step 108, the arithmetic average of the present steady state output voltage and the steady state output voltages that has been obtained so far is calculated, using as many steady state output voltages as already obtained up until then, and next at the step 105, this arithmetic average AAV(I) is outputted as the I-th measured liquid level.

On the other hand, at the step 109, the arithmetic average for the present measurement cycle AAV(I) is set equal to the arithmetic average AAV(I−1) obtained for the immediately preceding measurement cycle, and next at the step 105, this arithmetic average AAV(I) is outputted as the I-th measured liquid level.

In a case of proceeding from the step 106 to the step 110, at the step 110, whether the present steady state output voltage is within the prescribed range or not is determined. If yes, the step 111 is taken next, whereas otherwise the above described step 109 is taken next.

At the step 111, the predetermined number of the previously obtained steady state output voltages which has been within the prescribed range are selected along with the present steady state output voltage as the steady state output voltages to be used in calculating the arithmetic average.

Then, at the next step 112, the arithmetic average AAV(I) of the present steady state output voltage and the predetermined number of previously obtained steady state output voltages selected at the step 111 is calculated, and next at the step 105, this arithmetic average AAV(I) is outputted as the I-th measured liquid level.

As described, according to this second embodiment, it becomes possible to provide a method of heat radiating type level sensor measurement of liquid level capable of accounting for the agitated motion of the liquid surface.

Now, the heat radiating type level sensor system configuration shown in FIG. 6 used for the first and second embodiments described above has a drawback that the A/D converter 3 is required to have a high resolution of over 12 bits in order to deal with the change of the sensor output voltage Vp with sufficient precision, because the change of the voltage occurring in the sensor FL including the influence due to the environmental temperature change is quite large, such that the A/D converter 3 becomes quite expensive.

In the following, the embodiments of the present invention in which this drawback of the heat radiating type level sensor system of FIG. 6 is resolved will be described.

Figure 17:
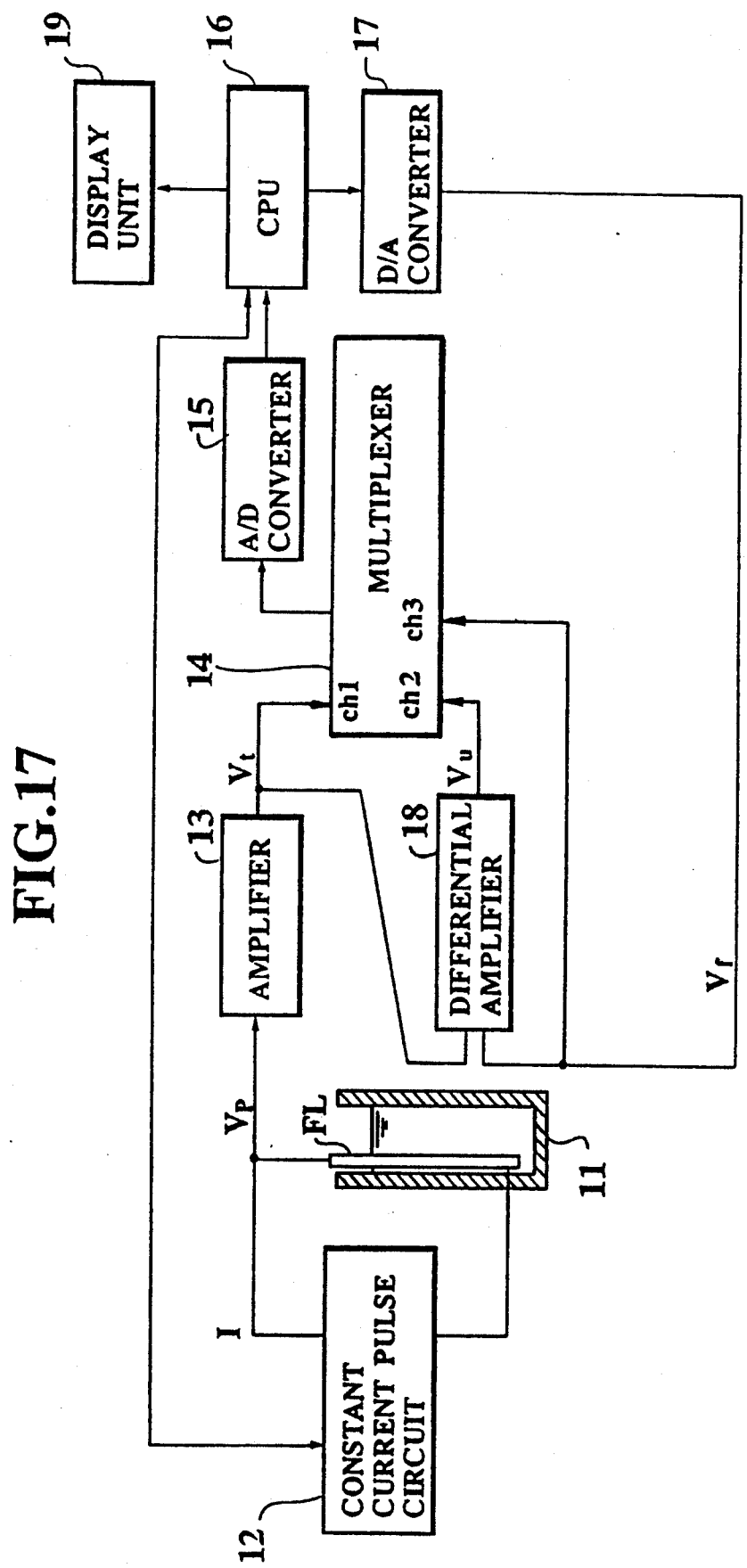
FIG. 17 is a schematic block diagram of one embodiment of a heat radiating type level sensor system according to the present invention.

Referring now to FIG. 17, one embodiment of a heat radiating type level sensor system according to the present invention will be described in detail.

This heat radiating type level sensor system of FIG. 17 comprises: a fuel tank 11 containing the fuel whose level is to be measured; a sensor FL made of a resistive body which is immersed into the fuel inside the fuel tank 11; a constant current pulse circuit 12 for supplying a constant current I between two ends of the sensor FL; an amplifier 13 for amplifying an output voltage Vp outputted from the sensor FL in order to obtain an amplified output voltage Vt; a multiplexer 14 for receiving the amplified output voltage Vt outputted from the amplifier 13; an A/D converter 15 for converting an output voltage signal of the multiplexer 14 into digital voltage signals; a CPU 16 for processing the digital voltage signals obtained by the A/D converter 15 to obtain measured liquid level; an D/A converter 17 for converting an offset voltage determined by the CPU 16 into analog offset voltage signal Vf to be supplied to the multiplexer 14; a differential amplifier 18 for obtaining a difference voltage signal Vu to be supplied to the multiplexer 14 from the amplified output voltage Vt and the analog offset voltage signal Vf; and a display unit 19 for displaying the measured liquid level obtained by the CPU 16.

The multiplexer 14 receives the amplifier output voltage Vt at a channel-1 (ch1), the difference voltage signal Vu at a channel-2 (ch2), and the analog offset voltage signal Vf at a channel-3 (ch3), and outputs one of these received signals as the output voltage signal to be supplied to the A/D converter 15.

The differential amplifier 18 obtains the difference voltage signal Vu by subtracting the analog offset voltage signal Vf from the amplified output voltage Vt. Here, the amplification gain of the differential amplifier 18 is set to be larger than that of the amplifier 13.

The constant current pulse circuit 12 generates pulse shaped currents I in which a measurement cycle including a conduction period between times $t_0$ and $t_f$ followed by a predetermined cooling period is repeated, just as in the constant current pulse circuit 2 of FIG. 6. In response, the output voltage Vp takes a form in which the output voltage Vp repeats the cycle of increase from the initial voltage with a slope corresponding to the liquid level, where the larger slope corresponds to the lower liquid level. The output voltage Vp is measured at predetermined sampling timings $t_1$ to $t_n$ and subsequently taken into the CPU 16 and stored in a memory of the CPU 16 in conjunction with the measurement time.

Now, the operation of this heat radiating type level sensor system of FIG. 17 is carried out according to the flow chart of FIG. 18, as follows.

First, at the step 201, the sensor FL is turned on, and the constant current pulse circuit 12 supplies the currents I to the sensor FL.

Then, at the step 202, the output voltage Vp outputted from the sensor FL in response to the conduction of the currents I is measured at the predetermined sampling timing $t_A$ at which the currents I reached the constant level, and the measured output voltage is amplified by the amplifier 13 to obtain the amplified output voltage $Vt_A$. Here, the amplifier 13 amplifies the measured output voltage with the amplification gain less than 1, in order to reduce the amplitude of the amplified output voltage $Vt_A$ within the limited input range of the A/D converter 15. This amplified output voltage $Vt_A$ is subsequently taken into the CPU 16 through the multiplexer 14 and the A/D converter 15, and stored in a memory of the CPU 16 for the sake of determining the offset voltage Vf.

After the measurement has been completed at the step 202, next at the step 203, the sensor FL is turned off. Here, the conduction of the currents I between the steps 201 to 203 should be kept as short as possible in order to avoid the significant increase of the sensor temperature.

Next, at the step 204, the CPU 16 determines the offset voltage Vf according to the amplified output voltage $Vt_A$ measured at the predetermined sampling timing $t_A$.

Then, at the step 205, the determined offset voltage Vf is converted into the analog offset voltage signal Vf at the D/A converter 17, which is then supplied to the differential amplifier 18.

Figure 19A:
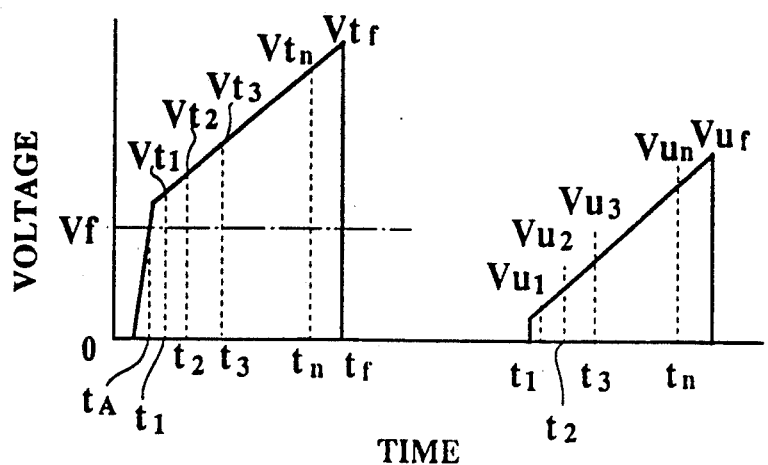
FIGS. 19A and 19B are graphs of pulse shaped current and measured output voltage in the heat radiating type level sensor system of FIG. 17.
Figure 19B:
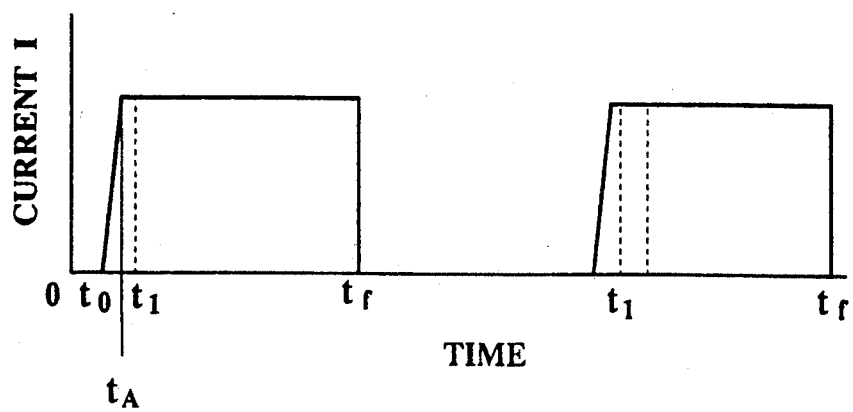

Next, at the step 206, the sensor FL is turned on again, and the pulse shaped currents I as shown in FIG. 19B are supplied from the constant current pulse circuit 12 to the sensor FL.

Then, at the step 207, the output voltage Vp outputted from the sensor FL in response to the conduction of the pulse shaped currents I is measured at the predetermined sampling timings $t_1$ to $t_n$, and the measured output voltages are amplified by the amplifier 13 to obtain the amplified output voltages $Vt_1$ to $Vt_n$, as shown in a left side pulse in FIG. 19A. Then, the amplified output voltages $Vt_1$ to $Vt_n$ obtained by the amplifier 13 are supplied to the differential amplifier 18, such that the differential amplifier 18 calculates the difference voltage signals $Vu_1$ to $Vu_n$ by subtracting the analog offset voltage signal Vf from each of the amplified output voltages $Vt_1$ to $Vt_n$, as shown in a right side pulse shown in FIG. 19A. The calculated difference voltage signals $Vu_1$ to $Vu_n$ are subsequently taken into the CPU 16 through the multiplexer 14 and the A/D converter 15, and stored in a memory of the CPU 16.

After the measurement for one measurement cycle has been completed at the step 207, next at the step 208, the sensor FL is turned off again.

Next, at the step 208, the CPU 16 recovers the amplified output voltages $Vt_1$ to $Vt_n$ obtained at the step 207 from the difference voltage signals $Vu_1$ to $Vu_n$ obtained at the step 207 and the offset voltage Vf. Then, the CPU 16 carries out the data processing similar to that carried out by the CPU 4 of FIG. 6 described above, so as to obtain the steady state output voltage. Namely, the CPU 16 divides the amplified output voltages $Vt_2$ to $Vt_n$ by the initial amplified output voltage $Vt_1$, in order to compensate the environmental temperature dependence. Then, the CPU 16 calculates the linearly approximated output voltage $Vtc'$ at a time tc by linearly approximating the slope of the increase of the amplified output voltages with the environmental temperature dependence compensation $Vt_1/Vt_1$ to $Vt_n/Vt_1$ with respect to time $t_1$ to $t_n$, and according to this linearly approximated output voltage $Vtc'$, the CPU 16 derives the steady state output voltage Vtc at a time tc, using prescribed data processing programs installed into the CPU 16.

Next, at the step 210, the cooling period Tw of a predetermined duration is taken before the operation returns to the step 201 described above, for the next measurement cycle.

Finally, at the step 211, after several steady state output voltages are obtained by the CPU 16 by the repetition of the above described operation from the step 201 to the step 210, the CPU 16 calculates the final steady state output voltage by averaging the obtained steady state output voltages and displays this final steady state output voltage as the measured liquid level on the display unit 19. Here, it is to be noted that each steady state output voltage obtained at the step 209 may be displayed as the measured liquid level on the display unit 19 at the step 211, without accumulating several steady state output voltages and taking an average of them as described above.

It is to be noted that, in order to improve the resolution in the measured liquid level, it is preferable in this configuration of FIG. 17 to set the value of the offset voltage Vf according to the environmental temperature, because the output voltages of the sensor FL can vary for over 2 V with respect to the change of the environmental temperature from $-10°$ to $+50°$ C.

In this configuration of FIG. 17, in obtaining the offset voltage Vf at the step 204, the measurement at the step 202 is required to have only the rough precision, so that it is sufficient for the A/D converter 15 to convert only the amplified output voltage which actually has the reduced amplitude as the amplifier 13 amplifies the measured output voltage with the amplification gain less than 1.

Figure 20:
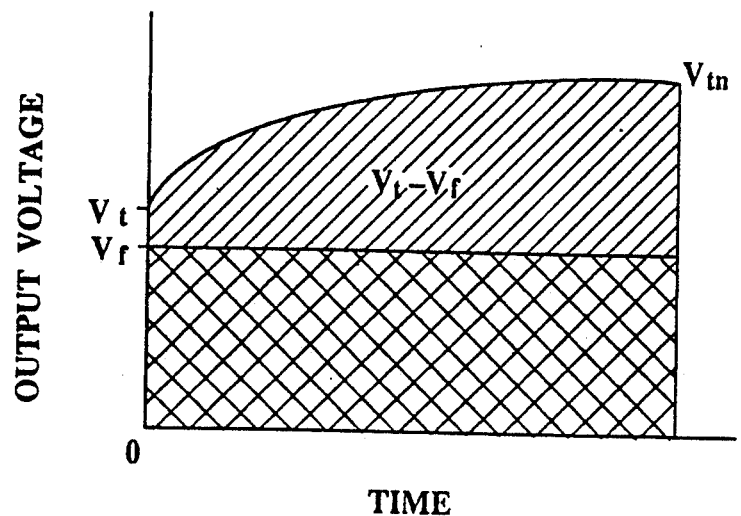
FIG. 20 is a graph of the output voltage versus time for explaining the effectiveness of the heat radiating type level sensor system of FIG. 17.

Then, in obtaining the steady state output voltage at the step 209, the A/D converter is required to convert only the difference voltage signals $V_u$ which are lower than the amplified output voltages Vt by the magnitude of the analog offset voltage signal Vf as shown in FIG. 20. Thus, the required conversion range of the A/D converter 15 can be narrower, and therefore the cheaper A/D converter having a lower resolution may be used for this A/D converter 15.

On the other hand, the difference voltage signals $V_u$ indicate the change of the measured output voltages in an amplified scale, so that the high precision can be achieved in the measured liquid level calculated from the difference voltage signals $V_u$.

Thus, according to this embodiment, it becomes possible to use the cheaper A/D converter having a lower resolution, without sacrificing the precision in the measured liquid level.

Now, in the above described heat radiating type level sensor system configuration of FIG. 17, there still is a problem of the error due to the change of the offset voltage caused by the change in the environmental temperature.

Namely, in the configuration of FIG. 17, there would be no problem if the D/A converter 17 has the resolution at a level similar to that required for detecting the change of the sensor output voltage. However, such a D/A converter with the high resolution is very expensive, so that a less expensive D/A converter having the resolution at a level similar to that of the A/D converter 15 has been employed.

Figure 21:
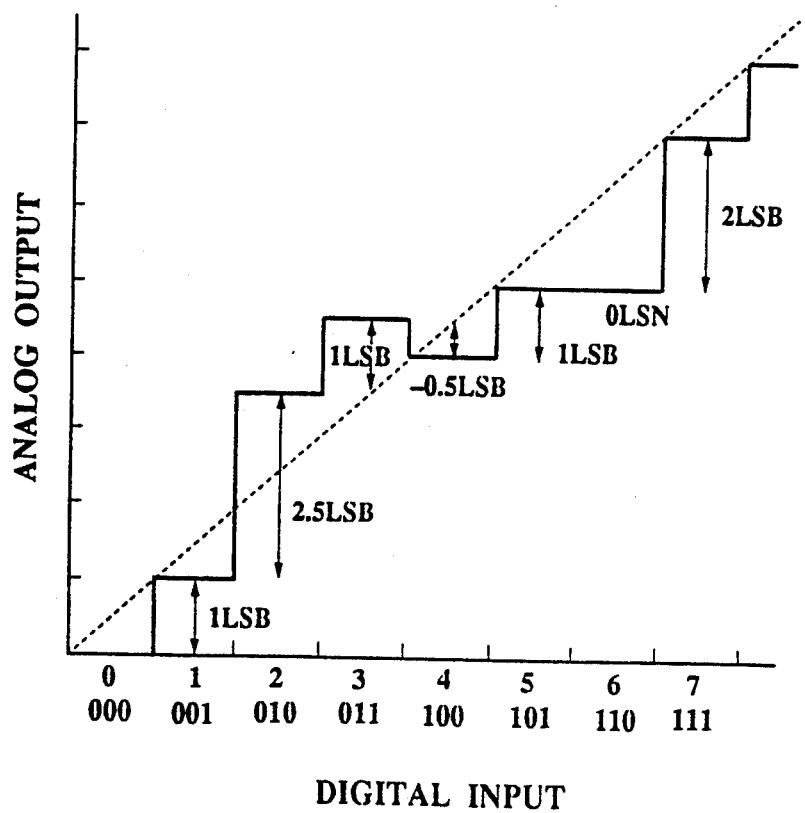
FIG. 21 is a graph of the output voltage versus time for explaining the problem of the heat radiating type level sensor system of FIG. 17.

In such a case of using the less expensive D/A converter, if the offset voltage remains constant, the error in the output of the D/A converter would also be constant, so that the stable measured liquid level can be obtained. However, when there is a change in the environmental temperature, the offset voltage is affected by this change in the environmental temperature, such that there is a fluctuation in the differential linearity of the D/A converter as shown in FIG. 21, and this could cause the large fluctuation in the measured liquid level.

In order to cope with this problem of the fluctuation in the measured liquid level due to the change of the offset voltage caused by the change in the environmental temperature, it is preferable to modify the operation of the heat radiating type level sensor system of FIG. 17 in such a manner that a plurality of offset voltages $Vf_1$, $Vf_2$, etc. which are different from each other by at least 1 LSB (Least Significant Bit) in digital units are used to obtain a plurality of steady state output voltages, and the final steady state output voltage is determined by taking an average of these plurality of steady state output voltages, in order to compensate the environmental temperature change.

More specifically, such a modified operation of the heat radiating type level sensor system of FIG. 17 is carried out according to the flow chart of FIG. 22, as follows. In the flow chart of FIG. 22, the steps 201 to 203 and 205 to 211 are substantially the same as the steps labelled by the same reference numerals in the flow chart of FIG. 18, so that their description will be omitted here.

Figure 18:
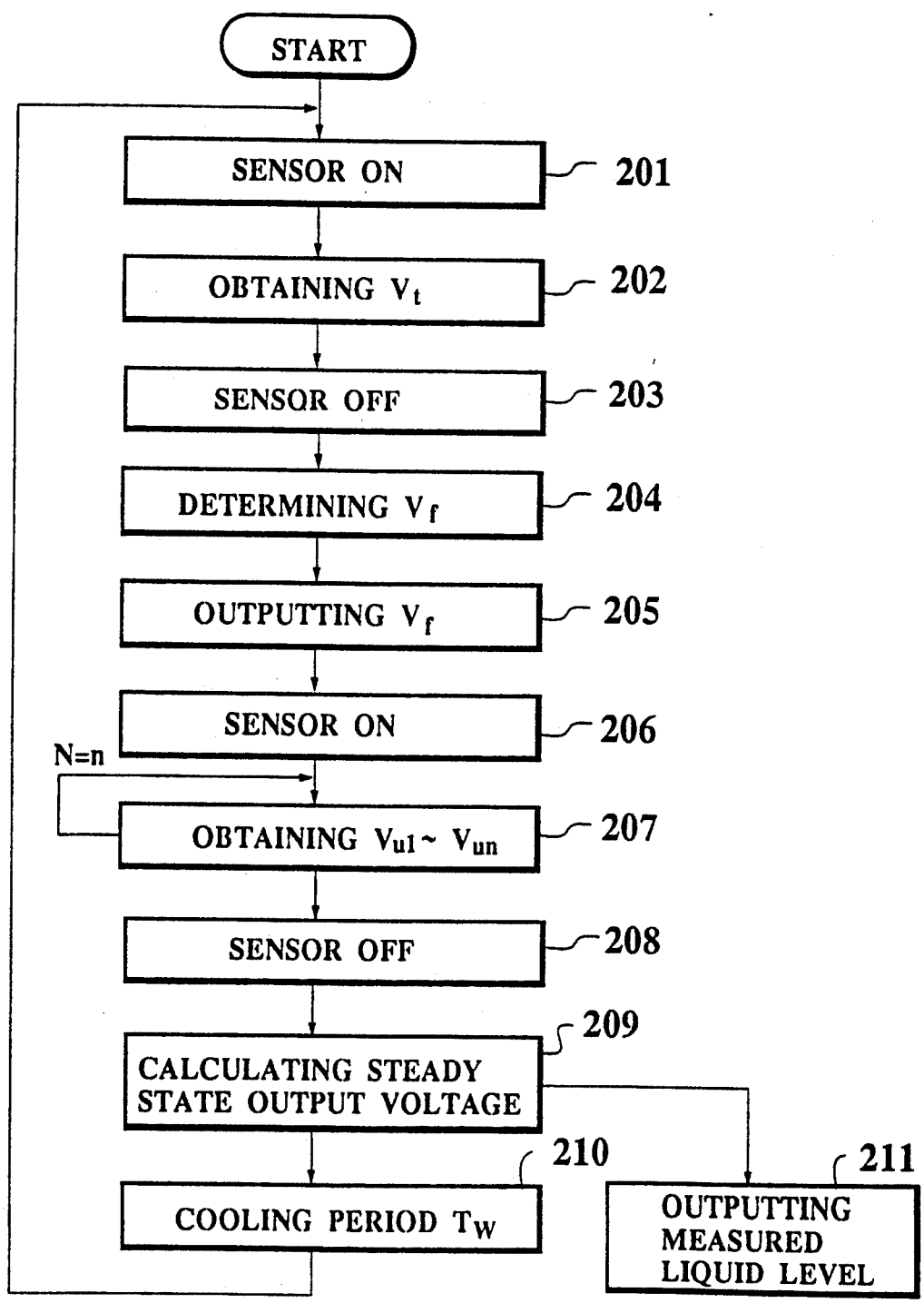
FIG. 18 is a flow chart for the operation of the heat radiating type level sensor system of FIG. 17.
Figure 22:
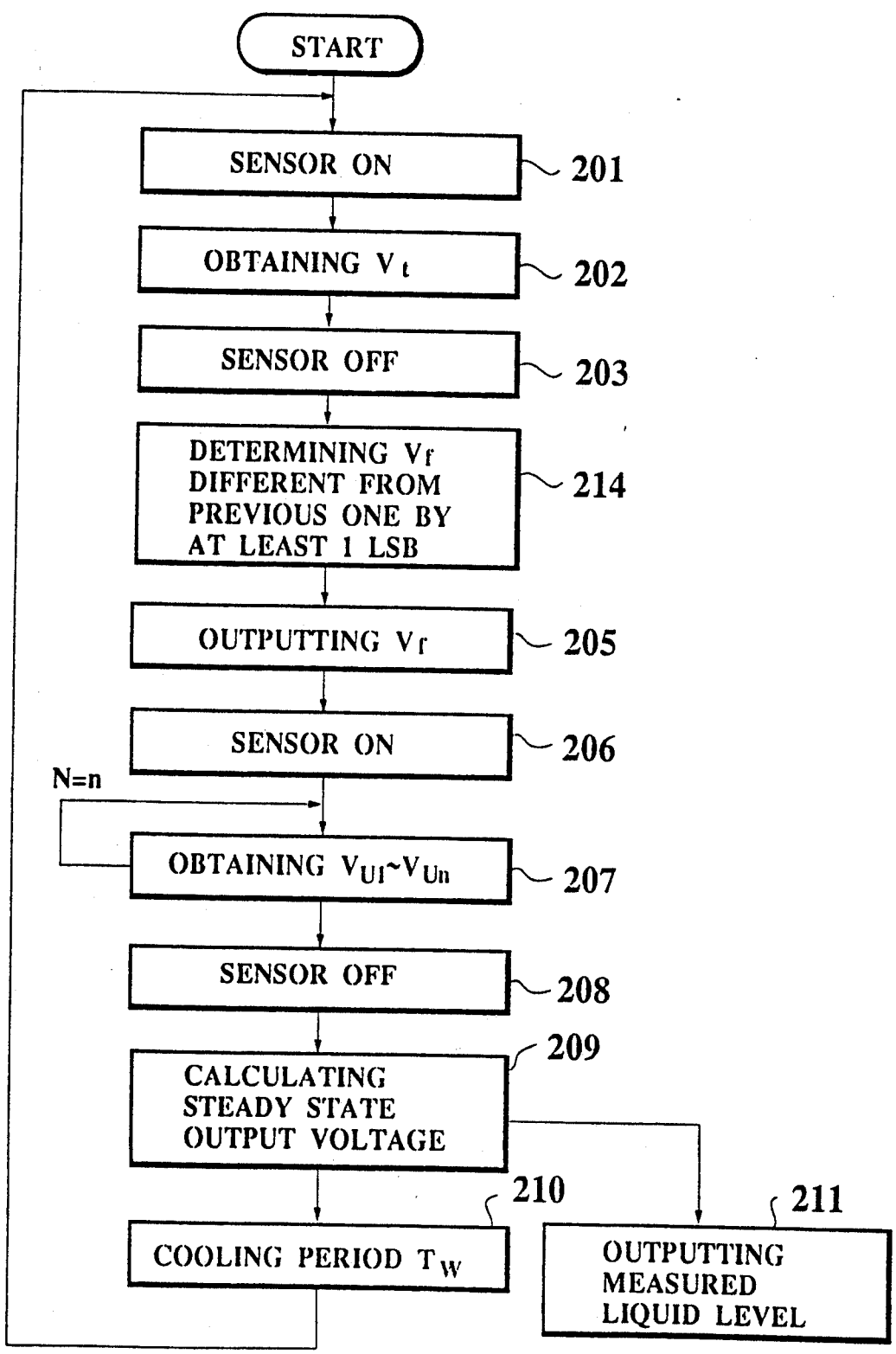
FIG. 22 is a flow chart for a modified operation of the heat radiating type level sensor system of FIG. 17 to overcome the problem explained by FIG. 21.

Thus, this modified operation of FIG. 22 differs from the operation of FIG. 18 at the step 214 provided between the steps 203 and 205, which replaces the step 204 of the flow chart shown in FIG. 18.

At this step 214, the CPU 16 determines the offset voltage Vf which is different from the previously used offset voltage by at least 1 LSB.

Figure 23:
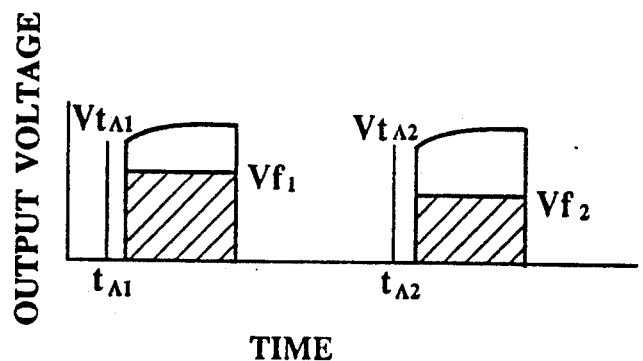
FIG. 23 is a graph of the output voltage versus time for explaining the procedure carried out in the flow chart of FIG. 22.

Accordingly, as the operation is repeated for a number of times using different offset voltages $Vf_1$, $Vf_2$, etc., a number of steady state output voltages are obtained for each of these different offset voltages at the step 208, as shown in FIG. 23, and after all these steady state output voltages are obtained by the CPU 16 by the repetition of the above described modified operation, the CPU 16 calculates the final steady state output voltage by averaging the obtained steady state output voltages and displays this final steady state output voltage as the measured liquid level on the display unit 19 at the step 211.

Now, the above described modified operation of FIG. 22 can be further modified in order to improve the processing speed, as follows.

Figure 24A:
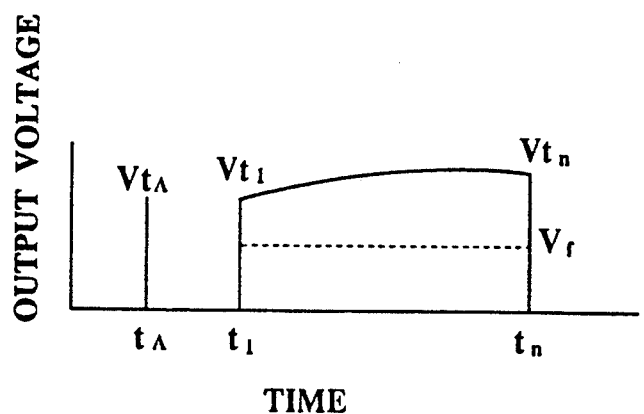
FIG. 24A is a graph of the output voltage versus time for explaining the procedure carried out in the flow chart of FIG. 18.

Namely, for the operation according to the flow chart shown in FIG. 18 or FIG. 22, the procedure can be graphically represented as shown in FIG. 24A in which the amplified output voltage $Vt_A$ is obtained for the predetermined sampling timing $t_A$ first, then the appropriate offset voltage Vf is determined according to this amplified output voltage $Vt_A$, and then the measurement of the amplified output voltages $Vt_1$ to $Vt_n$ from which the difference voltage signals $Vu_1$ to $Vu_n$ are to be obtained is carried out between the times $t_1$ and $t_n$.

Figure 24B:
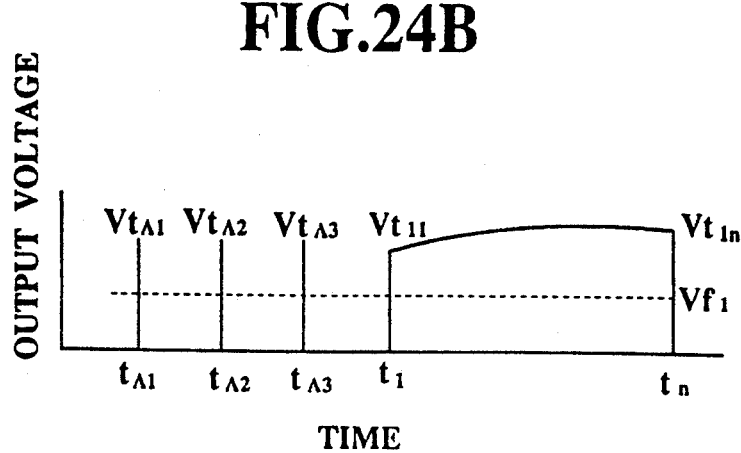
FIG. 24B is a graph of the output voltage versus time for explaining the procedure of a further modified operation of the heat radiating type level sensor system of FIG. 17 to improve the processing speed.

In contrast, the operation can be modified as shown in FIG. 24B, such that the amplified output voltage $Vt_{A1}$ is obtained for the predetermined sampling timing $t_{A1}$ first, and then the appropriate offset voltage $Vf_1$ is determined according to this amplified output voltage $Vt_{A1}$. Then, before carrying out the measurement of the amplified output voltages $Vt_{11}$ to $Vt_{1n}$ to obtain the difference voltage signals $Vu_{11}$ to $Vu_{1n}$ by using the first offset voltage $Vf_1$ between the times $t_1$ and $t_n$, the other offset voltages $Vf_2$ and $Vf_3$ which are different from the first offset voltage $Vf_1$ as well as from each other by at least 1 LSB are determined, and the difference voltage signals $Vu_{A2}$ and $Vu_{A3}$ are obtained at times $t_{A2}$ and $t_{A3}$.

Then, the measurement of the amplified output voltages $Vt_1(t) = \{Vt_{11}, Vt_{12}, —, Vt_{1n}\}$ is carried out and the difference voltage signals $Vu1(t) = \{Vu_{11}, Vu_{12}, —, Vu_{1n}\}$ are obtained by using the first offset voltage $Vf_1$.

As for the second and third offset voltages $Vf_2$ and $Vf_3$, the difference voltage signals $Vu_2(t)$ and $Vu_3(t)$ are obtained from the difference voltage signals $Vu_1(t)$, and the difference voltage signals $Vu_{A2}$ and $Vu_{A3}$.

Then, the CPU calculates the steady state output voltages from these difference voltage signals $Vu_1(t)$, $Vu_2(t)$, and $Vu_3(t)$, and the offset voltages $Vf_1$, $Vf_2$, and $Vf_3$, and then determines the measured liquid level by taking an average of these steady state output voltages.

Figure 25:
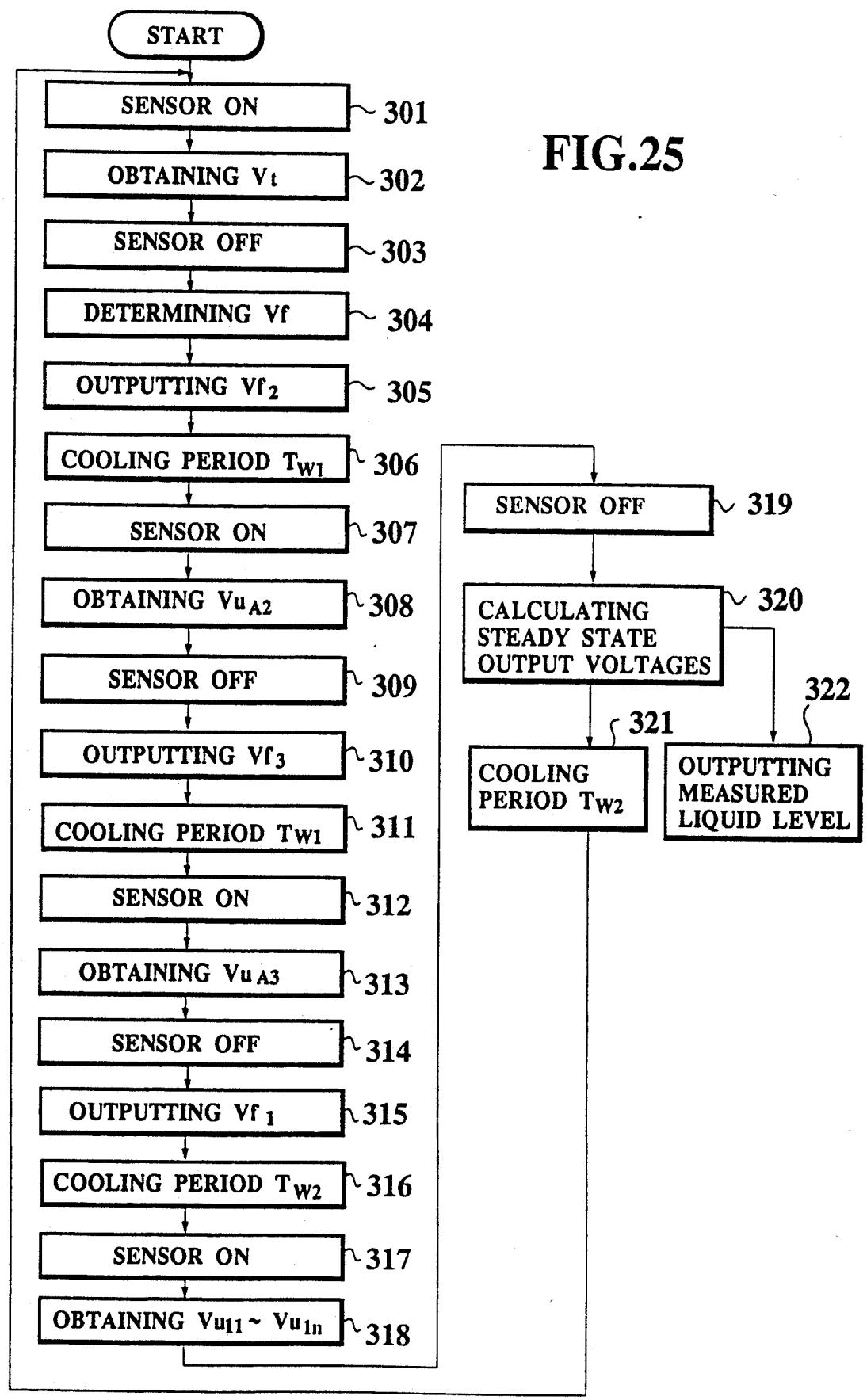
FIG. 25 is a flow chart for the further modified operation of the heat radiating type level sensor system of FIG. 17 to improve the processing speed explained by FIG. 24B.

More specifically, such a further modified operation of the heat radiating type level sensor system of FIG. 17 is carried out according to the flow chart of FIG. 25, as follows.

First, at the step 301, the sensor FL is turned on, and the constant current pulse circuit 12 supplies the currents I to the sensor FL.

Then, at the step 302, the output voltage Vp outputted from the sensor FL in response to the conduction of the currents I is measured at the predetermined sampling timing $t_A$ at which the currents I reached the constant level, and the measured output voltage is amplified by the amplifier 13 to obtain the amplified output voltage $Vt_{A1}$. Here, the amplifier 13 amplifies the measured output voltage with the amplification gain less than 1, in order to reduce the amplitude of the amplified output voltahe $Vt_{A1}$ within the limited input range of the A/D converter 15. This amplified output voltage $Vt_{A1}$ is subsequently taken into the CPU 16 through the multiplexer 14 and the A/D converter 15, and stored in a memory of the CPU 16 for the sake of determining the offset voltages $Vf_1$, $Vf_2$, and $Vf_3$.

Then, at the step 303, the sensor FL is turned off. Here, the conduction of the currents I between the steps 301 to 303 should be kept as short as possible in order to avoid the significant increase of the sensor temperature.

Next, at the step 304, the CPU 16 determines the offset voltages $Vf_1$, $Vf_2$, and $Vf_3$ which are different from each other by at least 1 LSB, according to the amplified output voltage $Vt_{A1}$ obtained at the step 302.

Then, at the step 305, the determined second offset voltage $Vf_2$ is converted into the analog offset voltage signal $Vf_2$ at the D/A converter 17, which is then supplied to the differential amplifier 18.

Then, at the step 306, the cooling period $Tw_1$ of the predetermined duration is taken.

Next, at the step 307, the sensor FL is turned on again, and the currents I are supplied from the constant current pulse circuit 12 to the sensor FL.

Then, at the step 308, the output voltage Vp outputted from the sensor FL in response to the conduction of the currents I is measured at a predetermined sampling timing $t_{A2}$ at which the currents I reached the constant level and the measured output voltage is amplified by the amplifier 13 to obtain the amplified output voltage $Vt_{A2}$. Then, this amplified output voltage $Vt_{A2}$ obtained by the amplifier 13 is supplied to the differential amplifier 18, such that the differential amplifier 18 calculates the difference voltage signal $Vu_{A2}$ by subtracting the analog offset voltage signal $Vf_2$ from the amplified output voltage $Vt_{A2}$. The calculated difference voltage signal $Vu_{A2}$ is subsequently taken into the CPU 16 through the multiplexer 14 and the A/D converter 15, and stored in a memory of the CPU 16.

Then, at the step 309, the sensor FL is turned off again. Here, as before, the conduction of the currents I between the steps 307 to 309 should be kept as short as possible in order to avoid the significant increase of the sensor temperature.

Next, at the step 310, the determined third offset voltage $Vf_3$ is converted into the analog offset voltage signal $Vf_3$ at the D/A converter 17, which is then supplied to the differential amplifier 18.

Then, at the step 311, the cooling period $Tw_1$ of the predetermined duration is taken.

Next, at the step 312, the sensor FL is turned on again, and the currents I are supplied from the constant current pulse circuit 12 to the sensor FL.

Then, at the step 313, the output voltage Vp outputted from the sensor FL in response to the conduction of the currents I is measured at a predetermined sampling timing $t_{A3}$ at which the pulse shaped currents I reached the constant level and the measured output voltage is amplified by the amplifier 13 to obtain the amplified output voltage $Vt_{A3}$. Then, this amplified output voltage $Vt_{A3}$ obtained by the amplifier 13 is supplied to the differential amplifier 18, such that the differential amplifier 18 calculates the difference voltage signal $Vu_{A3}$ by subtracting the analog offset voltage signal $Vf_3$ from the amplified output voltage $Vt_{A3}$. The calculated difference voltage signal $Vu_{A3}$ is subsequently taken into the CPU 16 through the multiplexer 14 and the A/D converter 15, and stored in a memory of the CPU 16.

Then, at the step 314, the sensor FL is turned off again. Here, as before, the conduction of the currents I between the steps 312 to 314 should be kept as short as possible in order to avoid the significant increase of the sensor temperature.

Next, at the step 315, the determined first offset voltage $Vf_1$ is converted into the analog offset voltage signal $Vf_1$ at the D/A converter 17, which is then supplied to the differential amplifier 18.

Then, at the step 316, the cooling period $Tw_1$ of the predetermined duration is taken.

Next, at the step 317, the sensor FL is turned on again, and the pulse shaped currents I are supplied from the constant current pulse circuit 12 to the sensor FL.

Then, at the step 318, the output voltage Vp outputted from the sensor FL in response to the conduction of the pulse shaped currents I is measured at the predetermined sampling timings $t_1$ to $t_n$, and the measured output voltages are amplified by the amplifier 13 to obtain the amplified output voltages $Vt_{11}$ to $Vt_{1n}$. Then, the amplified output voltages $Vt_{11}$ to $Vt_{1n}$ obtained by the amplifier 13 are supplied to the differential amplifier 18, such that the differential amplifier 18 calculates the difference voltage signals $Vu_{11}$ to $Vu_{1n}$ by subtracting the analog offset voltage signal $Vf_1$ from each of the amplified output voltages $Vt_{11}$ to $Vt_{1n}$. The calculated difference voltage signals $Vu_{11}$ to $Vu_{1n}$ are subsequently taken into the CPU 16 through the multiplexer 14 and the A/D converter 15, and stored in a memory of the CPU 16.

After the measurement for one measurement cycle has been completed at the step 318, next at the step 319, the sensor FL is turned off again.

Next, at the step 320, the CPU 16 recovers the amplified output voltages $Vt_1(t) = \{Vt_{11}, Vt_{12}, \ldots, Vt_{1n}\}$ obtained at the step 318 from the difference voltage signals $Vu_{11}$ to $Vu_{1n}$ obtained at the step 318 and the offset voltage $Vf_1$. Then, the CPU 16 carries out the data processing similar to that carried out by the CPU 4 of FIG. 6 described above, so as to obtain the first steady state output voltage. Namely, the CPU 16 divides the amplified output voltages $Vt_{12}$ to $Vt_{1n}$ by the initial amplified output voltage $Vt_{11}$, in order to compensate the environmental temperature dependence. Then, the CPU 16 calculates the linearly approximated output voltage $Vtc'$ at a time $tc$ by linearly approximating the slope of the increase of the amplified output voltages with the environmental temperature dependence compensation $Vt_{11}/Vt_{11}$ to $Vt_{1n}/Vt_{11}$ with respect to time $t_1$ to $t_n$, and according to this linearly approximated output voltage $Vtc'$, the CPU 16 derives the steady state output voltage $Vtc$ at a time $tc$, using prescribed data processing programs installed into the CPU 16.

The CPU 16 also calculates the difference voltage signals $Vu_2(t) = \{Vu_{21}, Vu_{22}, \ldots, Vu_{2n}\}$ and $Vu_3(t) = \{Vu_{31}, Vu_{32}, \ldots, Vu_{3n}\}$ according to the following equations (2) and (3).

$$Vu_2(t) = \{Vu_1(t) - Vu_{11}\} + Vu_{A2} \quad (2)$$

$$Vu_3(t) = \{Vu_1(t) - Vu_{11}\} - + Vu_{A3} \quad (3)$$

Then, the CPU 16 calculates the second and third steady state output voltages from these difference voltage signals $Vu_2(t)$ and $Vu_3(t)$ and the second and third offset voltages $Vf_2$ and $Vf_3$, just as in the case of the first offset voltage $Vf_1$ described above.

Next, at the step 321, the cooling period $Tw_2$ of a predetermined duration is taken before the operation returns to the step 301 described above, for the next measurement cycle.

Meanwhile, the CPU 16 determines the measured liquid level by taking an average of the first, second, and third steady state output voltages, and displays this measured liquid level on the display unit 19.

It is to be noted that the cooling period $Tw_1$ provided at the steps 306, 311, and 316 may be omitted in a case the switching of the offset voltages can be carried out quicker than the change of the sensor output voltage.

It is further to be noted that instead of using the above described equations (2) and (3), the average of the initial amplified output voltages $Vt_{A1}$, $Vt_{A2}$, and $Vt_{A3}$ can be used as the initial amplified output voltage in calculating the steady state output voltage at the cpu 16.

Figure 26:
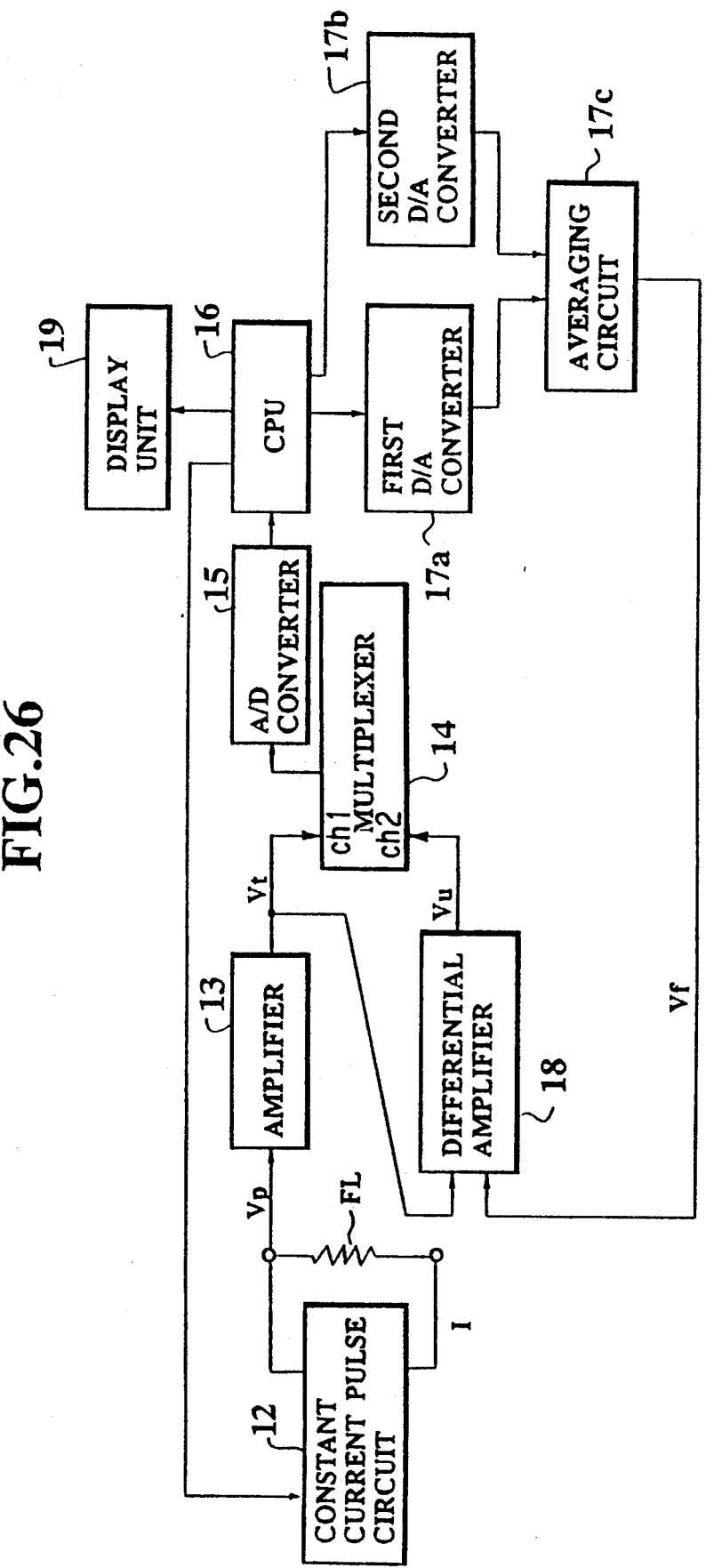
FIG. 26 is a schematic block diagram of another embodiment of a heat radiating type level sensor system according to the present invention.

Referring now to FIG. 26, another embodiment of a heat radiating type level sensor system according to the present invention will be described in detail. In FIG. 26, those elements which are substantially equivalent to the elements appearing in the configuration shown in FIG. 17 described above are given the same reference numerals, and their description will be omitted here.

This heat radiating type level sensor system of FIG. 26 differs from the configuration shown in FIG. 17 described above in that the D/A converter 17 of FIG. 17 is replaced by a first D/A converter 17a, a second D/A converter 17b, and an averaging circuit 17c for averaging the outputs of the first and second D/A converters 17a and 17b to obtain the analog offset voltage signal Vf.

Here, the first and second D/A converters 17a and 17b may receive two different offset voltages which are different from each other by at least 1 LSB, or the first and second D/A converters 17a and 17b may have different conversion characteristics from each other, or both of these at the same time.

In this configuration of FIG. 26, because of the averaging of the outputs of two D/A converters 17a and 17b, the error on the offset voltage due to the fluctuation in the differential linearity of the D/A converter caused by the environmental temperature change can be made smaller, and therefore the fluctuation in the measured liquid level can be suppressed.

It is to be noted that a number of the D/A converters to be employed can be made larger than two, and a plurality of the D/A converters employed may be contained within a single package.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of heat radiating type level sensor measurement of liquid level, comprising the steps of:
    applying constant currents intermittently to a heat radiating type level sensor made of a resistive body which is immersed into a liquid;
    measuring output voltages of the heat radiating type liquid sensor in response to the constant currents applied at the applying step;
    dividing the output voltages measured at the measuring step by an initial output voltage, to obtain adjusted output voltages;
    deriving a steady state output voltage from a slope of the adjusted output voltages obtained at the dividing step with respect to time; and
    determining a measured liquid level from the steady state output voltage derived at the deriving step, according to:

$$V''tc = Vtc + (V_1 - V'_1) \times G$$

where $V''tc$ is the measured liquid level, $Vtc$ is the steady state output voltage, $V_1$ is the initial output voltage for a present measurement, $V'_1$ is the initial output voltage for an immediately preceding measurement, and $G$ is a predetermined constant.

2. A method of heat radiating type level sensor measurement of liquid level, comprising the steps of:
    applying constant currents intermittently to a heat radiating type level sensor made of a resistive body which is immersed into a liquid;
    measuring output voltages of the heat radiating type liquid sensor in response to the constant currents applied at the applying step;
    deriving a steady state output voltage from the output voltages measured at the measuring step; and
    determining a measured liquid level for a present measured as an arithmetic average of the steady state output voltage derived at the deriving step and a predetermined number of previous steady state output voltages within a prescribed range which had been obtained by previous measurements, in a case in which the steady state output voltage derived at the deriving step is within the prescribed range, and as the measured liquid level which had been obtained for an immediately preceding measurement, in a case in which the steady state output voltage derived at the deriving step is outside of the prescribed range.

3. The method of claim 2, wherein the deriving step further comprises the steps of:
   dividing the output voltages measured at the measuring step by an initial output voltage, to obtain adjusted output voltages; and
   obtaining the steady state output voltage from a slope of the adjusted output voltages obtained at the dividing step with respect to time.

4. The method of claim 2, wherein at the determining step, for the present measurement, a central value of the prescribed range is adjusted according to the measured liquid level for the immediately preceding measurement.

5. A method of heat radiating type level sensor measurement of liquid level, comprising the steps of:
   applying constant currents intermittently to a heat radiating type level sensor made of a resistive body which is immersed into a liquid;
   measuring output voltages of the heat radiating type liquid sensor in response to the constant currents applied at the applying step;
   setting offset voltages according to the output voltages measured at the measuring step;
   obtaining difference voltages by substracting the offset voltages set at the setting step from the output voltages measured at the measuring step;
   converting the difference voltages obtained at the obtaining step into digital voltage signals;
   deriving a steady state output voltage from the offset voltages set at the setting step and the digital voltage signals obtained at the converting step; and
   determining a measured liquid level from the steady state output voltage derived at the deriving step.

6. The method of claim 5, wherein the deriving step includes the steps of:
   reconstructing the output voltages as digital output signals from the offset voltages and the digital voltage signals;
   dividing the digital output voltages reconstructed at the reconstructing step by an initial output voltage, to obtain adjusted output voltages; and
   deriving the steady state output voltage from a slope of the adjusted output voltages obtained at the dividing step with respect to time.

7. The method of claim 6, wherein at the setting step, a plurality of offset voltages which are different from each other by at least 1 LSB (Least Significant Bit) in digital units are set, and wherein at the dividing step, the initial output voltage is an average of the initial output voltages obtained with respect to said plurality of offset voltages.

8. The method of claim 5, wherein at the setting step, a plurality of offset voltages which are different from each other by at least 1 LSB (Least Significant Bit) in digital units are set, and wherein the obtaining, converting, and deriving steps are carried out with respect to each of said plurality of offset voltages, and wherein at the determining step, the measured liquid level is determined as an average of the steady state output voltages derived at the deriving step with respect to said plurality of offset voltages.

9. The method of claim 5, wherein at the setting step, a plurality of offset voltages which are different from each other by at least 1 LSB (Least Significant Bit) in digital units are set, and wherein the obtaining and converting steps are carried out with respect to only a first offset voltage of said plurality of offset voltages, and which further comprises the step of calculating digital voltage signals with respect to said plurality of offset voltages other than said first offset voltage from the digital voltage signals with respect to said first offset voltage and the initial output voltages with respect to said plurality of offset voltages.

10. A heat radiating type level sensor system for measuring a liquid level, comprising:
   a heat radiating type level sensor made of a resistive body which is immersed into a liquid;
   constant current supply means for applying constant currents intermittently to the heat radiating type level sensor;
   output detection means for measuring output voltages of the heat radiating type liquid sensor in response to the constant currents applied by the constant current supply means;
   offset setting means for setting offset voltages according to the output voltages measured by the output detecting means;
   differential amplifier means for obtaining difference voltages by subtracting the offset voltages set by the offset setting means from the output voltages measured by the output detection means;
   an A/D converter for converting the difference voltages obtained by the differential amplifier means into digital voltage signals;
   processor means for deriving a steady state output voltage from the offset voltages set by the offset setting means and the digital voltage signals obtained by the A/D converter; and
   output means for determining a measured liquid level from the steady state output voltage derived by the processor means.

11. The apparatus of claim 10, wherein the processor means derives the steady state output voltage by reconstructing the output voltages as digital output signals from the offset voltages and the digital voltage signals; dividing the reconstructed digital output voltages by an initial output voltage, to obtain adjusted output voltages; and deriving the steady state output voltage from a slope of the adjusted output voltages with respect to time.

12. The apparatus of claim 10, wherein the offset setting means includes:
   a plurality of D/A converters for converting the offset voltages into analog signals; and
   averaging means for averaging the analog signals obtained by said plurality of D/A converters, to obtain analog offset voltage signals representing the offset voltages to be supplied to the differential amplifier means.

13. The apparatus of claim 12, wherein each of said plurality of D/A converters converts one of a plurality of offset voltages which are different from each other by at least 1 LSB (Least Significant Bit) in digital units.

14. The apparatus of claim 12, wherein said plurality of D/A converters have different conversion characteristics from each other.

* * * * *